US011290280B1

(12) United States Patent
Nelson et al.

(10) Patent No.: US 11,290,280 B1
(45) Date of Patent: Mar. 29, 2022

(54) CRYPTOCURRENCY MINING USING A SINGLE-LEADER ELECTION ALGORITHM

(71) Applicant: Blockstack PBC, New York, NY (US)

(72) Inventors: Jude Nelson, New Brunswick, NJ (US); Aaron Blankstein, Chicago, IL (US)

(73) Assignee: Hiro Systems PBC, New York, NY (US)

( * ) Notice: Subject to any disclaimer, the term of this patent is extended or adjusted under 35 U.S.C. 154(b) by 497 days.

(21) Appl. No.: 16/424,158

(22) Filed: May 28, 2019

(51) Int. Cl.
*H04L 9/32* (2006.01)
*H04L 9/30* (2006.01)

(52) U.S. Cl.
CPC .............. *H04L 9/3239* (2013.01); *H04L 9/30* (2013.01); *H04L 2209/38* (2013.01); *H04L 2209/56* (2013.01)

(58) Field of Classification Search
CPC ..... H04L 9/3239; H04L 9/30; H04L 2209/38; H04L 2209/56
See application file for complete search history.

(56) References Cited

U.S. PATENT DOCUMENTS

| | | | | |
|---|---|---|---|---|
| 10,102,265 | B1* | 10/2018 | Madisetti | G06F 16/27 |
| 10,581,591 | B1* | 3/2020 | Branton | H04L 9/0822 |
| 10,698,728 | B1* | 6/2020 | Nelson | H04L 9/0637 |
| 11,157,899 | B1* | 10/2021 | Nelson | H04L 9/0643 |
| 2017/0236123 | A1 | 8/2017 | Ali et al. | |
| 2018/0041345 | A1* | 2/2018 | Maim | H04L 9/32 |
| 2018/0204191 | A1 | 7/2018 | Wilson et al. | |
| 2019/0018888 | A1* | 1/2019 | Madisetti | H04L 9/3297 |
| 2019/0043024 | A1 | 2/2019 | Lancashire | |
| 2019/0095880 | A1* | 3/2019 | Glover | G06Q 20/065 |
| 2019/0188411 | A1 | 6/2019 | Kroutik | |
| 2019/0279172 | A1 | 9/2019 | Duffield et al. | |
| 2020/0233858 | A1 | 7/2020 | Deng et al. | |

OTHER PUBLICATIONS

Thompson, Feel the burn: Another way to earn money from cryptocurrency, https://coinrivet.com/feel-the-burn-another-way-to-earn-money-from-cryptocurrency/, Jan. 15, 2019.

(Continued)

*Primary Examiner* — Fatoumata Traore
*Assistant Examiner* — Mirza Israr Javed
(74) *Attorney, Agent, or Firm* — Knobbe Martens Olson & Bear LLP

(57) ABSTRACT

A blockchain single-leader election algorithm that overcomes the deficiencies of existing blockchain implementations, such as implementations that rely on the proof of work, is described herein. For example, the single-leader election algorithm may include a series of rounds, where at most one node is selected as a leader in each round and the selected leader is able to form a new block in the blockchain. The single-leader election is not an election in which there are votes, but an election in which a node is selected as a leader at random to avoid bias, such as the bias that is present in existing blockchain implementations. Any node can become a leader, and the elections are driven by burning or destroying a cryptocurrency that is different than the cryptocurrency provided to a node as a block reward and transaction fees when the node is selected as a leader.

17 Claims, 16 Drawing Sheets

(56) References Cited

OTHER PUBLICATIONS

Binance Academy, What IS a Coin Burn? https://academy.binance.com/en/articles/what-is-a-coin-burn, 2021.

Njui, Binance Burns 9.4 Million Worth of BNB on its $6^{th}$ Quarterly Coin Burn, https://ethereumworldnews.com/binance-burns-9-4-million-worth-of-bnb-on-its-6th-quarterly-coin-burn/, Jan. 16, 2019.

Silkjaer, 14 Common Misunderstandings About Ripple And XRP, https://www.forbes.com/sites/thomassilkjaer/2019/03/07/14-common-misunderstandings-about-ripple-and-xrp/, Mar. 7, 2019.

Chavez-Dreyfuss, Crypto bear market threatens to last as potential token supply weighs, https://www.reuters.com/article/us-crypto-currencies-icos-analysis-idUSKCN1PX18W, Feb. 8, 2019.

Stacks plans to burn Bitcoin via PoB mechanism, https://cryptoheroes.ch/stacks-plans-to-burn-bitcoin-via-pob-mechanism/, Feb. 4, 2019.

Revision history of "Proof of burn", https://en.bitcoin.it/w/index.php?title=Proof_of_burn&action=history, retrieved Apr. 27, 2021.

Proof of burn, https://en.bitcoin.it/w/index.php?title=Proof_of_burn&oldid=33833, Dec. 16, 2012.

Proof of burn, https://en.bitcoin.it/wiki/Proof_of_burn, Jan. 15, 2018.

Gorka Irazoqui Apecechea, Cryptographic Sortition in Blockchains: the importance of VRFs, Jan. 25, 2019, p. 1-9 (Year: 2019).

Ali, Muneeb, Dissertation, Trust-to-Trust Design of a New Internet, dated Jun. 2017.

Ali, Muneeb et al., Blockstack: A New Decentralized Internet, dated May 2017.

Ali, Muneeb et al., Blockstack: A New Internet for Decentralized Applications, dated Oct. 2017.

Ali, Muneeb et al., Blockstack: A Global Naming and Storage System Secured by Blockchains. In Proceedings of the 2016 USENIX Annual Technical Conference, Jun. 2016.

Ali, Muneeb et al., Bootstrapping Trust in Distributed Systems with Blockchains. In USENIX ;login 41(3):52-58, Fall 2016.

Ali, Muneeb et al., The Blockstack Decentralized Computing Network, dated May 30, 2019.

Nelson, Jude et al., Extending Existing Blockchains with Virtualchain. In Workshop on Distributed Cryptocurrencies and Consensus Ledgers, 2016.

Nelson, Jude, Dissertation: Wide-Area Software-Defined Storage, dated Jun. 2018.

SIP-001 Burn Election, available at https://github.com/blockstack/blockstack-core/blob/f22836efbfeee13762811f411dae306ba1d9810e/sip/sip-001-burn-election.md, dated Jan. 18, 2019.

\* cited by examiner

CRYPTOCURRENCY MINING USING A SINGLE-LEADER ELECTION ALGORITHM

BACKGROUND

A blockchain is a distributed ledger that can be used to record transactions and reduce the likelihood that recorded transactions are altered retroactively. Generally, a blockchain can be implemented within a peer-to-peer network. Computing devices participating in the peer-to-peer network can each include a copy of the blockchain and broadcast transactions to other computing devices participating in the peer-to-peer network.

The blockchain itself can include a chain of blocks that are linked together cryptographically, with each block in the chain storing one or more transactions and the number of blocks in the chain growing over time. For example, a transaction can include a cryptocurrency payment, execution of a smart contract, submission of an online vote, and/or any other type of exchange or event. The blocks can be linked together using a cryptographic hash. For example, each block can include a cryptographic hash of a previous block in the chain. Because each block includes a cryptographic hash of a previous block in the chain, a transaction stored in one block cannot be altered without all subsequent blocks being altered as well. The likelihood that all subsequent blocks being altered is low given that such an alteration would require approval from a majority of the computing devices or participants participating in the blockchain.

SUMMARY

The systems, methods, and devices described herein each have several aspects, no single one of which is solely responsible for its desirable attributes. Without limiting the scope of this disclosure, several non-limiting features will now be discussed briefly.

One aspect of the disclosure provides a computing device of a decentralized network comprising a network interface configured to couple the computing device to the decentralized network. The computing device further comprises a hardware processor. The computing device further comprises a non-transitory computer readable storage medium storing program instructions for execution by the hardware processor in order to cause the computing device to: register a public key in association with a first block in a burn chain; generate a hash of a first proof stored in a header of a first block in a stack chain to form a first message, where the first block in the stack chain is anchored to the first block in the burn chain; generate a second proof using the first message and a private key; transmit a block commit in association with a second block in the burn chain, where the block commit comprises the second proof and an indication that a first amount of a first cryptocurrency is burned, and where the computing device is assigned an interval within a range of values, a length of the interval based on the first amount of the first cryptocurrency that is burned; obtain a proof of work nonce associated with the second block in the burn chain; generate a second value based on the first message and the proof of work nonce; and generate a second block in the stack chain in response to the second value falling within the interval, where the second block in the stack chain is anchored to the second block in the burn chain, and where a header of the second block in the stack chain comprises the second proof.

The computing device of the preceding paragraph can include any sub-combination of the following features: where the first and second blocks in the stack chain are associated with a first fork in the stack chain, and where a third block in the stack chain is associated with a second fork in the stack chain, where the first block in the stack chain and the third block in the stack chain share a parent block in the stack chain; where the program instructions, when executed, further cause the computing device to: determine a number of blocks in the first fork is greater than a number of blocks in the second fork, and determine that the first fork is a valid fork; where the block commit further comprises a hash of data of a parent block in the stack chain and a reference to the parent block in the stack chain; where the parent block in the stack chain comprises the first block in the stack chain; where the program instructions, when executed, further cause the computing device to: combine the first message and the proof of work, and compute the combination modulo a normalization value to determine the second value; where the program instructions, when executed, further cause the computing device to obtain a block reward in response to the second value falling within the interval; and where the block reward is a second cryptocurrency different than the first cryptocurrency.

Another aspect of the disclosure provides a computer-implemented method comprising: under control of a computing device in a decentralized network, registering a public key in association with a first block in a burn chain; generating a hash of a first proof stored in a header of a first block in a stack chain to form a first message; generating a second proof using the first message and a private key; transmitting a block commit in association with a second block in the burn chain, where the block commit comprises the second proof and an indication that a first amount of a cryptocurrency is burned, and where the computing device is assigned an interval within a range of values, a length of the interval based on the first amount of the cryptocurrency that is burned; obtaining a proof of work nonce associated with the second block in the burn chain; generating a second value based on the first message and the proof of work nonce; and generating a second block in the stack chain in response to the second value falling within the interval.

The computer-implemented method of the preceding paragraph can include any sub-combination of the following features: where the first and second blocks in the stack chain are associated with a first fork in the stack chain, and where a third block in the stack chain is associated with a second fork in the stack chain, where the first block in the stack chain and the third block in the stack chain share a parent block in the stack chain; where the computer-implemented method further comprises determining a number of blocks in the first fork is greater than a number of blocks in the second fork, and determining that the first fork is a valid fork; where the block commit further comprises a hash of data of a parent block in the stack chain and a reference to the parent block in the stack chain; where the parent block in the stack chain comprises the first block in the stack chain; where generating a second value further comprises: combining the first message and the proof of work, and computing the combination modulo a normalization value to determine the second value; where the computer-implemented method further comprises obtaining a block reward in response to the second value falling within the interval; and where the block reward is a second cryptocurrency different than the cryptocurrency.

Another aspect of the disclosure provides non-transitory, computer-readable storage media comprising computer-executable instructions for conducting a single-leader election in a blockchain, where the computer-executable instructions, when executed by a computer system, cause the computer system to: generate a hash of a first proof stored in a header of a first block in a stack chain to form a first message; generate a second proof using the first message and a private key; transmit a block commit in association with a first block in the burn chain, where the block commit comprises the second proof and an indication that a first amount of a cryptocurrency is burned, and where the computer system is assigned an interval within a range of values, a length of the interval based on the first amount of the cryptocurrency that is burned; obtain a proof of work nonce associated with the first block in the burn chain; generate a second value based on the first message and the proof of work nonce; and generate a second block in the stack chain in response to the second value falling within the interval.

The non-transitory, computer-readable storage media of the preceding paragraph can include any sub-combination of the following features: where the first and second blocks in the stack chain are associated with a first fork in the stack chain, and where a third block in the stack chain is associated with a second fork in the stack chain, where the first block in the stack chain and the third block in the stack chain share a parent block in the stack chain; where the computer-executable instructions further cause the computer system to: determine a number of blocks in the first fork is greater than a number of blocks in the second fork, and determine that the first fork is a valid fork; and where the computer-executable instructions further cause the computer system to: combine the first message and the proof of work, and compute the combination modulo a normalization value to determine the second value.

Another aspect of the disclosure provides a computing device of a decentralized network comprising a network interface configured to couple the computing device to the decentralized network. The computing device further comprises a hardware processor. The computing device further comprises a non-transitory computer readable storage medium storing program instructions for execution by the hardware processor in order to cause the computing device to: transmit a block commit in association with a first block in a burn chain, where the block commit comprises an indication that a first amount of a first cryptocurrency is burned; process a message indicating that a second amount of the first cryptocurrency is burned by other computing devices in the decentralized network in association with the first block in the burn chain; determine that a sum of the first amount of the first cryptocurrency burned by the computing device and the second amount of the first cryptocurrency burned by the other computing devices in association with the first block in the burn chain is less than a burn quota; and determine that no sortition associated with the first block in the burn chain occurred.

The computing device of the preceding paragraph can include any sub-combination of the following features: where the program instructions, when executed, further cause the computing device to: process a second message indicating that a third amount of the first cryptocurrency is burned by the other computing devices in the decentralized network in association with a second block in the burn chain, determine that a sum of the third amount of the first cryptocurrency burned by the other computing devices in association with the second block, the first amount of the first cryptocurrency burned by the computing device in association with the first block, and the second amount of the first cryptocurrency burned by the other computing devices in the decentralized network in association with the first block is greater than the burn quota, determine that a sortition associated with the second block occurred, and decrement the burn quota; where the program instructions, when executed, further cause the computing device to decrement the burn quota by a set amount; where the program instructions, when executed, further cause the computing device to decrement the burn quota by an amount determined by a number of sortitions that are skipped; where the program instructions, when executed, further cause the computing device to: process a third message indicating that a fourth amount of the first cryptocurrency is burned by the other computing devices in the decentralized network in association with a third block in the burn chain, determine that the fourth amount of the first cryptocurrency burned by the other computing devices in association with the third block is greater than the decremented burn quota, determine that a sortition associated with the third block occurred, and increment the decremented burn quota; where the program instructions, when executed, further cause the computing device to increment the decremented burn quota by a set amount; where the program instructions, when executed, further cause the computing device to increment the decremented burn quota by an amount determined by a number of consecutive sortitions that have been performed; where a result of the sortition is based on block commits submitted in association with the second block and not the first block; and where the program instructions, when executed, further cause the computing device to determine that a sum of the first amount of the first cryptocurrency burned by the computing device in association with the first block, the second amount of the first cryptocurrency burned by the other computing devices in association with the first block, and a third amount of the first cryptocurrency burned by the other computing devices in association with a second block in the burn chain that is a parent of the first block is less than a burn quota.

Another aspect of the disclosure provides a computer-implemented method comprising: under control of a computing device in a decentralized network, transmitting a block commit in association with a first block in a burn chain, where the block commit comprises an indication that a first amount of a cryptocurrency is burned; processing a message indicating that a second amount of the cryptocurrency is burned by another computing device in the decentralized network in association with the first block in the burn chain; determining that a sum of the first amount of the cryptocurrency burned by the computing device and the second amount of the cryptocurrency burned by the other computing device in association with the first block in the burn chain is less than a burn quota; and determining that no sortition associated with the first block in the burn chain occurred.

The computer-implemented method of the preceding paragraph can include any sub-combination of the following features: where the computer-implemented method further comprises: processing a second message indicating that a third amount of the cryptocurrency is burned by the other computing device in the decentralized network in association with a second block in the burn chain, determining that a sum of the third amount of the cryptocurrency burned by the other computing device in association with the second block, the first amount of the cryptocurrency burned by the computing device in association with the first block, and the second amount of the cryptocurrency burned by the other computing device in the decentralized network in association with the first block is greater than the burn quota, determining that a sortition associated with the second block occurred, and decrementing the burn quota; where decrementing the burn quota further comprises decrementing the burn quota by a set amount; where decrementing the burn quota further comprises decrementing the burn quota by an amount determined by a number of sortitions that are skipped; where the computer-implemented method further comprises: processing a third message indicating that a fourth amount of the cryptocurrency is burned by the other computing device in the decentralized network in association with a third block in the burn chain, determining that the fourth amount of the cryptocurrency burned by the other computing device in association with the third block is greater than the decremented burn quota, determining that a sortition associated with the third block occurred, and incrementing the decremented burn quota; where incrementing the decremented burn quota further comprises incrementing the decremented burn quota by a set amount; where incrementing the decremented burn quota further comprises incrementing the decremented burn quota by an amount determined by a number of consecutive sortitions that have been performed; where a result of the sortition is based on block commits submitted in association with the second block and not the first block; and where determining that a sum of the first amount of the cryptocurrency burned by the computing device and the second amount of the cryptocurrency burned by the other computing device in association with the first block in the burn chain is less than a burn quota further comprises determining that a sum of the first amount of the cryptocurrency burned by the computing device in association with the first block, the second amount of the cryptocurrency burned by the other computing device in association with the first block, and a third amount of the cryptocurrency burned by the other computing device in association with a second block in the burn chain that is a parent of the first block is less than a burn quota.

Another aspect of the disclosure provides non-transitory, computer-readable storage media comprising computer-executable instructions for conducting a single-leader election in a blockchain using a burn quota, where the computer-executable instructions, when executed by a computer system, cause the computer system to: transmit a block commit in association with a first block in a burn chain, where the block commit comprises an indication that a first amount of a cryptocurrency is burned; process a message indicating that a second amount of the cryptocurrency is burned by another computer system in association with the first block in the burn chain; determine that a sum of the first amount of the cryptocurrency burned by the computing device and the second amount of the cryptocurrency burned by the other computer system in association with the first block in the burn chain is less than a burn quota; and determine that no sortition associated with the first block in the burn chain occurred.

The non-transitory, computer-readable storage media of the preceding paragraph can include any sub-combination of the following features: where the computer-executable instructions further cause the computer system to: process a second message indicating that a third amount of the cryptocurrency is burned by the other computing device in the decentralized network in association with a second block in the burn chain, determine that a sum of the third amount of the cryptocurrency burned by the other computing device in association with the second block, the first amount of the cryptocurrency burned by the computing device in association with the first block, and the second amount of the cryptocurrency burned by the other computing device in the decentralized network in association with the first block is greater than the burn quota, determine that a sortition associated with the second block occurred, and decrement the burn quota.

Another aspect of the disclosure provides a computing device of a decentralized network comprising a network interface configured to couple the computing device to the decentralized network. The computing device further comprises a hardware processor. The computing device further comprises a non-transitory computer readable storage medium storing program instructions for execution by the hardware processor in order to cause the computing device to: process a message indicating that a first amount of a first cryptocurrency is burned by a second computing device in the decentralized network in association with a first block in a burn chain; transmit a user burn transaction in association with the first block in the burn chain, where the user burn transaction comprises an indication that a second amount of the first cryptocurrency is burned and a reference to a block commit submitted by the second computing device; determine that the second computing device is selected as a leader based on a sortition that occurred in association with the first block in the burn chain; and process a reward received as a result of the user burn transaction and the sortition, where the reward is associated with a second cryptocurrency different than the first cryptocurrency.

The computing device of the preceding paragraph can include any sub-combination of the following features: where the second computing device receives a second reward and transaction fees associated with a first block in a stack chain as a result of the block commit and the sortition; the sortition is associated with a total award, and where a percentage of the total reward that is the reward is based on a percentage of a sum of the first amount and the second amount that is the second amount; the first amount is less than a burn quota; a sum of the first amount and the second amount is greater than a burn quota; the program instructions, when executed, further cause the computing device to transmit a second user burn transaction in association with the first block in the burn chain, where the second user burn transaction comprises an indication that a third amount of the first cryptocurrency is burned and a reference to a second block commit submitted by a third computing device in the decentralized network; and where the program instructions, when executed, further cause the computing device to transmit the user burn transaction prior to transmission of a public key registration transaction.

Another aspect of the disclosure provides a computer-implemented method comprising: under control of a computing device in a decentralized network, processing a message indicating that a first amount of a first cryptocurrency is burned by a second computing device in the decentralized network in association with a first block in a burn chain; transmitting a user burn transaction in association with the first block in the burn chain, where the user burn transaction comprises an indication that a second amount of the first cryptocurrency is burned and a reference to a block commit submitted by the second computing device; determining that the second computing device is selected as a leader based on a sortition that occurred in association with the first block in the burn chain; and processing a reward received as a result of the user burn transaction and the sortition, where the reward is associated with a second cryptocurrency different than the first cryptocurrency.

The computer-implemented method of the preceding paragraph can include any sub-combination of the following features: where the second computing device receives a second reward and transaction fees associated with a first block in a stack chain as a result of the block commit and the sortition; where the sortition is associated with a total award, and where a percentage of the total reward that is the reward is based on a percentage of a sum of the first amount and the second amount that is the second amount; where the first amount is less than a burn quota; where a sum of the first amount and the second amount is greater than a burn quota; where the computer-implemented method further comprises transmitting a second user burn transaction in association with the first block in the burn chain, where the second user burn transaction comprises an indication that a third amount of the first cryptocurrency is burned and a reference to a second block commit submitted by a third computing device in the decentralized network; and where transmitting a user burn transaction further comprises transmitting the user burn transaction prior to transmission of a public key registration transaction.

Another aspect of the disclosure provides non-transitory, computer-readable storage media comprising computer-executable instructions for conducting a single-leader election in a blockchain using user burn transactions, where the computer-executable instructions, when executed by a computer system, cause the computer system to: process a message indicating that a first amount of a first cryptocurrency is burned by a second computer system in association with a first block in a burn chain; transmit a user burn transaction in association with the first block in the burn chain, where the user burn transaction comprises an indication that a second amount of the first cryptocurrency is burned and a reference to a block commit submitted by the second computer system; determine that the second computer system is selected as a leader based on a sortition that occurred in association with the first block in the burn chain; and process a reward received as a result of the user burn transaction and the sortition, where the reward is associated with a second cryptocurrency different than the first cryptocurrency.

The non-transitory, computer-readable storage media of the preceding paragraph can include any sub-combination of the following features: where the second computer system receives a second reward and transaction fees associated with a first block in a stack chain as a result of the block commit and the sortition; where the sortition is associated with a total award, and where a percentage of the total reward that is the reward is based on a percentage of a sum of the first amount and the second amount that is the second amount; where the first amount is less than a burn quota; where a sum of the first amount and the second amount is greater than a burn quota; and where the computer-executable instructions further cause the computer system to transmit a second user burn transaction in association with the first block in the burn chain, where the second user burn transaction comprises an indication that a third amount of the first cryptocurrency is burned and a reference to a second block commit submitted by a third computer system.

Another aspect of the disclosure provides a computing device of a decentralized network comprising a network interface configured to couple the computing device to the decentralized network. The computing device further comprises a hardware processor. The computing device further comprises a non-transitory computer readable storage medium storing program instructions for execution by the hardware processor in order to cause the computing device to: generate after a first number of guesses a proof of work nonce that, when combined with another value and hashed, forms a first value that is less than a first threshold value, where a value of the proof of work nonce is based on the first number of guesses; transmit a block commit in association with a first block in a burn chain, where the block commit comprises an indication that a first amount of a first cryptocurrency is burned and the proof of work nonce; process a message indicating that a second computing device in the decentralized network submitted a second block commit in associated with the first block, where the second block commit comprises an indication that a second amount of the first cryptocurrency is burned; and determine that the computing device is selected as a leader based on a sortition that occurred in association with the first block, where a probability that the computing device is selected as the leader is based on a combination of the first amount of the first cryptocurrency and a third amount of the first cryptocurrency that is derived using the proof of work nonce.

The computing device of the preceding paragraph can include any sub-combination of the following features: where the first number of guesses corresponds to a first amount of electricity, and where the first amount of electricity corresponds to the third amount of the first cryptocurrency; where the first amount of electricity is consumed to perform the first number of guesses; where the first amount of electricity, if consumed to mine the first cryptocurrency, produces the third amount of the first cryptocurrency; where a probability that the second computing device is selected as the leader is based on the second amount of the first cryptocurrency; where the combination of the first amount of the first cryptocurrency and the third amount of the first cryptocurrency comprises a work score, and where, at a first time, a percentage of the work score that is the third amount is restricted to be no greater than a first threshold percentage; and where the first threshold percentage is incremented at a second time after the first time.

Another aspect of the disclosure provides a computer-implemented method comprising: under control of a computing device in a decentralized network, generating after a first number of guesses a proof of work nonce that, when combined with another value and hashed, forms a first value that is less than a first threshold value, where a value of the proof of work nonce is based on the first number of guesses; transmitting a block commit in association with a first block in a burn chain, where the block commit comprises an indication that a first amount of a first cryptocurrency is burned and the proof of work nonce; processing a message indicating that a second computing device in the decentralized network submitted a second block commit in associated with the first block, where the second block commit comprises an indication that a second amount of the first cryptocurrency is burned; and determining that the computing device is selected as a leader based on a sortition that occurred in association with the first block, where a probability that the computing device is selected as the leader is based on a combination of the first amount of the first cryptocurrency and a third amount of the first cryptocurrency that is derived using the proof of work nonce.

The computer-implemented method of the preceding paragraph can include any sub-combination of the following features: where the first number of guesses corresponds to a first amount of electricity, and where the first amount of electricity corresponds to the third amount of the first cryptocurrency; where the first amount of electricity is consumed to perform the first number of guesses; where the first amount of electricity, if consumed to mine the first cryptocurrency, produces the third amount of the first cryptocurrency; where a probability that the second computing device is selected as the leader is based on the second amount of the first cryptocurrency; where the combination of the first amount of the first cryptocurrency and the third amount of the first cryptocurrency comprises a work score, and where, at a first time, a percentage of the work score that is the third amount is restricted to be no greater than a first threshold percentage; and where the first threshold percentage is incremented at a second time after the first time.

Another aspect of the disclosure provides a non-transitory, computer-readable storage media comprising computer-executable instructions for conducting a single-leader election in a blockchain using a separate proof of work nonce, where the computer-executable instructions, when executed by a computer system, cause the computer system to: generate after a first number of guesses a proof of work nonce that, when combined with another value and hashed, forms a first value that is less than a first threshold value, where a value of the proof of work nonce is based on the first number of guesses; transmit a block commit in association with a first block in a burn chain, where the block commit comprises an indication that a first amount of a first cryptocurrency is burned and the proof of work nonce; process a message indicating that a second computing device in the decentralized network submitted a second block commit in associated with the first block, where the second block commit comprises an indication that a second amount of the first cryptocurrency is burned; and determine that the computing device is selected as a leader based on a sortition that occurred in association with the first block, where a probability that the computing device is selected as the leader is based on a combination of the first amount of the first cryptocurrency and a third amount of the first cryptocurrency that is derived using the proof of work nonce.

The non-transitory, computer-readable storage media of the preceding paragraph can include any sub-combination of the following features: where the first number of guesses corresponds to a first amount of electricity, and where the first amount of electricity corresponds to the third amount of the first cryptocurrency; where the first amount of electricity is consumed to perform the first number of guesses; where the first amount of electricity, if consumed to mine the first cryptocurrency, produces the third amount of the first cryptocurrency; where a probability that the second computing device is selected as the leader is based on the second amount of the first cryptocurrency; and where the combination of the first amount of the first cryptocurrency and the third amount of the first cryptocurrency comprises a work score, and where, at a first time, a percentage of the work score that is the third amount is restricted to be no greater than a first threshold percentage.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF SPECIFIC EMBODIMENTS

Figure 1:
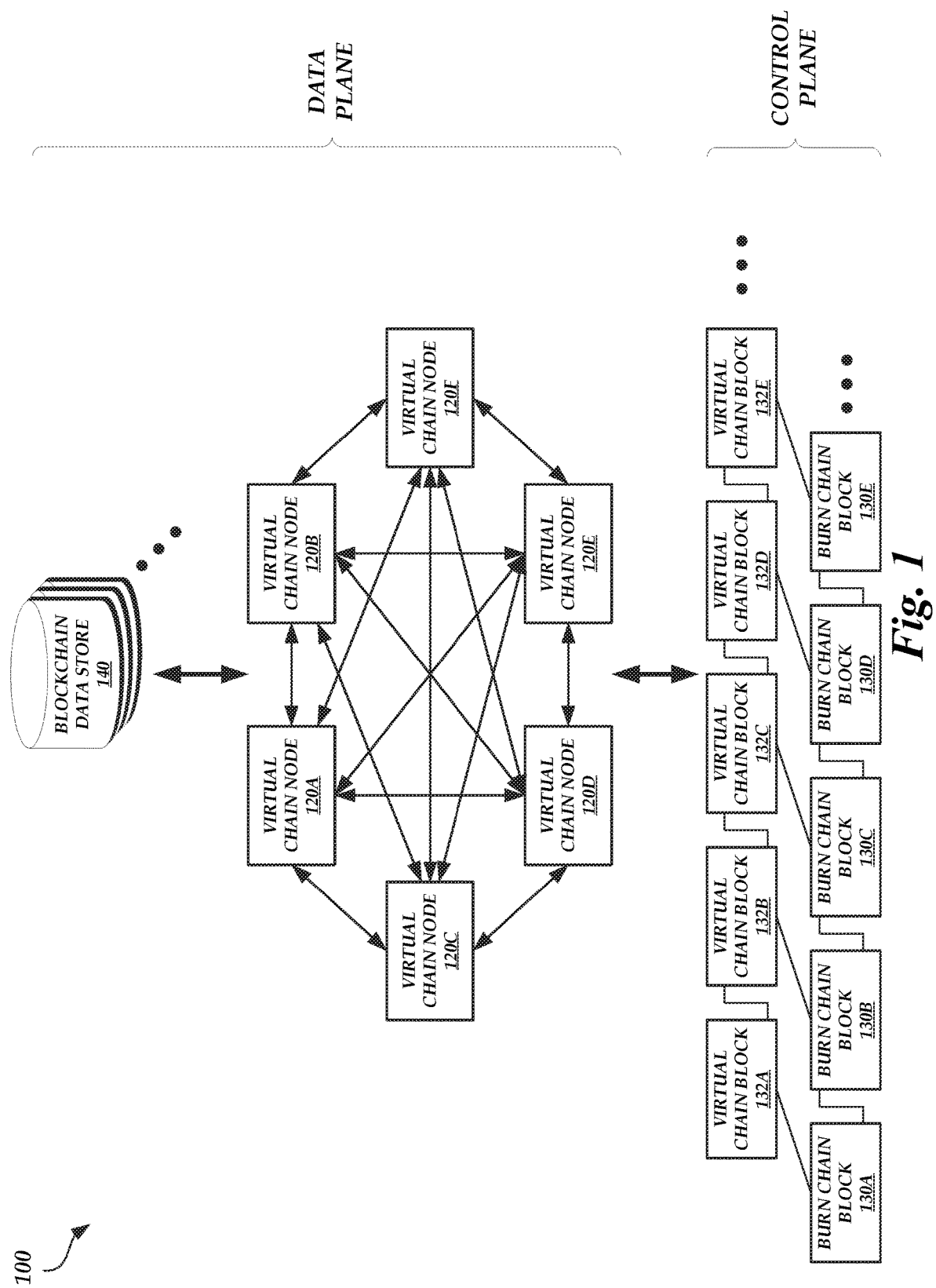
FIG. 1 is a block diagram of an illustrative operating environment in which an improved blockchain is implemented.

As described above, a blockchain is a distributed ledger that can be used to record transactions. The blockchain includes a set of blocks, the number of which grows over time. To allow the blockchain to grow, computing devices may function as "miners," with at least one of the miners (e.g., computing devices) being selected to form a new block in the blockchain. The selected computing device may be referred to as a leader. To be considered for selection as a leader, a computing device may be required to expend resources. For example, in some conventional blockchain implementations, a computing device may be required to generate a proof of work in which the computing device is attempting to generate a hash value that is less than a target value. A computing device may have to generate multiple hash values before finding one that is less than the target value. The computing device is therefore consuming computing resources (e.g., processing resources), and ultimately energy (e.g., electricity), to find a hash value that is less than the target value.

Generally, the computing device that is first to find a hash value that is less than the target value is selected as the leader. While there is a cost associated with becoming the leader (e.g., the cost of the electricity consumed to find the hash value that is less than the target value), the computing device selected as a leader is rewarded with a block reward (e.g., cryptocurrency) and/or transaction fees. For example, as described herein, transactions are stored or encoded in blocks. To submit a transaction, a computing device may have to pay a transaction fee to the leader (e.g., computing device) forming the block within which the transaction is to be stored.

Relying on the proof of work to select the leader can prevent one computing device from simulating multiple computing devices in an attempt to "stuff the ballot" and become the leader of the next block in the blockchain. However, this approach can be wasteful as a high amount of energy may be consumed each time a new block is formed in the blockchain. In addition, this approach can favor computing devices that have access to a cheaper source of energy. For example, a computing device with access to a cheap source of energy may be able to generate more hashes than another computing device in an attempt to find a hash value that is less than the target value before the energy cost outweighs any transaction fees that may be garnered by being selected as the leader. Moreover, this approach can favor computing devices that have computing power (e.g., processing power) that far exceeds the computing power of other computing devices. Such computing devices may be able to generate hashes faster than other computing devices, and therefore be selected as leader more often than other computing devices.

Accordingly, aspects of the present disclosure provide a blockchain single-leader election algorithm that overcomes the deficiencies of existing blockchain implementations, such as implementations that rely on the proof of work discussed above. For example, the single-leader election algorithm may include a series of rounds, where at most one node (e.g., computing device participating in the peer-to-peer network) is selected as a leader in each round and the selected leader is able to form a new block in the blockchain (also referred to herein as the "stack chain" or the "virtual chain"). The single-leader election is not an election in which there are votes, but an election in which a node is selected as a leader at random to avoid bias, such as the bias discussed above that is present in existing blockchain implementations. Any node can become a leader, and the elections are driven by burning or destroying a cryptocurrency that is different than the cryptocurrency provided to a node as a block reward and transaction fees when the node is selected as a leader. The burned or destroyed cryptocurrency can be any cryptocurrency in which all nodes have access to the same information about the cryptocurrency. For example, such cryptocurrencies can include BITCOIN, ETHEREUM, LITECOIN, ZCASH, MONERO, NAMECOIN, PEERCOIN, etc.

As described in greater detail below, the single-leader election algorithm involves a cryptographic sortition that uses a burn chain (e.g., a blockchain corresponding to the cryptocurrency to be burned or destroyed) and a stack chain that logically resides above the burn chain. Each block in the stack chain is anchored to a block in the burn chain, and the node that wins an election is allowed to form a new block in the stack chain. The burn chain encodes the election history, which occurs in two phases.

In the first phase, nodes that wish to participate in a future election register a public key in a block in the burn chain. Once a node registers a public key in one block in the burn chain, the node may start participating in an election associated with a child block in the burn chain (e.g., the next block in the burn chain, the block after next in the burn chain, etc.).

The first phrase functions to reduce bias in the election process. As described below, the verifiable random function (VRF) proof of a node is a factor in selecting a leader of a new block being formed in the stack chain. The public key of the node can be used to verify that the VRF proof originated from the node and has not been altered after being submitted in a block commit. Once a node registers a public key in the burn chain, the public key cannot be altered. Thus, even if a node is aware at a later time of a VRF proof that could improve the node's chances of being selected as the leader, the node cannot alter the node's VRF proof to improve unfairly these chances.

In the second phase, a node that wishes to participate in an election in association with a current block in the burn chain submits a block commit. The block commit includes a VRF proof and an indication that a certain amount of the cryptocurrency associated with the burn chain has been burned or destroyed. For example, the node may generate a message that is a hash of a VRF proof present in a previous block in the stack chain. The node may then generate the VRF proof included in the block commit using the message and the node's private key (e.g., by hashing the message and the node's private key, by a combination of hashing the message and the node's private key and performing algebraic operations on elliptic curve points, etc.).

Any number of nodes can submit block commits in association with a current block in the burn chain. The probability that any one node is selected as the leader to form the next block in the stack chain may be based on how much cryptocurrency is burned or destroyed by the respective node. For example, if one node destroyed 20% of all the cryptocurrency destroyed by all nodes in the aggregate in association with a particular block in the burn chain, then this node may have a 20% chance of being selected as the leader.

Some or all of the nodes participating in the peer-to-peer network can each process a set of operations to perform the election or sortition for selecting the leader of a new block in the stack chain. For example, once all block commits have been received for a particular block in the burn chain, a node can assign a range of values between 0 and $2^{256}-1$ to each node that submitted a block commit. The length of an assigned range may correspond to the amount of cryptocurrency destroyed by the respective node. For example, a node that destroyed 20% of all the cryptocurrency destroyed in association with the block commits may be assigned 20% of the range of values between 0 and $2^{256}-1$. The node can then obtain a proof of work nonce from the header of the particular block in the burn chain, and identify a value between 0 and $2^{256}-1$ using the message and the proof of work nonce. As an illustrative example, the node can sum, hash, or otherwise combine the message and the proof of work nonce (which may be optionally scaled up to from a value between 0 and $2^{32}-1$ to a value between 0 and $2^{256}-1$), and calculate the combination modulo $2^{256}-1$ to identify the value in the range. The node assigned a range of values within which the identified value falls is then selected as the leader of the next block in the stack chain.

The operations described above for selecting the leader of the next block in the stack chain can prevent or reduce the likelihood of "ballot stuffing" because the chances for being selected as the leader can only be improved by destroying a resource (e.g., burning cryptocurrency)—simulating multiple nodes in attempt to become the leader is therefore ineffective. Unlike existing blockchain implementations, however, the improved blockchain implementation disclosed herein that uses the disclosed single-leader election algorithm can reduce the likelihood of "ballot stuffing" without wasting excessive amounts of energy, without favoring nodes that have cheap access to a source of energy, and without favoring nodes that have computing power that far exceeds the computing power of other nodes in the peer-to-peer network. Rather, nodes in the improved blockchain implementation disclosed herein can conduct a single-leader election that is fair and unbiased, with the chances of being selected as a leader subject to a node's willingness to part with a cryptocurrency associated with a burn chain.

While nodes in the peer-to-peer network may broadcast messages to each other, the network itself may be asynchronous and subject to transmission delays. For example, there may be situations in which packets are dropped, some nodes receive messages from a first set of nodes earlier than from a second set of nodes, or some nodes temporarily crash and are delayed in broadcasting certain messages. Such situations can result in forks in the stack chain. As an illustrative example, a first node may be selected as a leader of a first block in the stack chain. Before the first node is able to form the first block, the first node may crash. While the first node is rebooting, a second node may be selected as a leader of a second block in the stack chain. The second node may be able to form the second block before the first node can form the first block, and each node may identify the same block in the stack chain as the parent block to the first and second blocks. Some nodes may receive messages indicating that the first block has been formed before receiving messages indicating that the second block has been formed, and vice-versa. Thus, some future leaders may start forming a chain of blocks in the stack chain that directly or indirectly identify the first block as the parent block, whereas other future leaders may start forming a chain of blocks in the stack chain that directly or indirectly identify the second block as the parent block.

Forks can be problematic, however. For example, the nodes in the network may eventually resolve the fork by continuing to add blocks to one chain after the fork and not to the other chain after the fork. A malicious actor could attempt to influence how the fork is resolved to try to revise a transaction history (e.g., by causing other nodes to resolve the fork by selecting a chain in which the malicious actor has a majority of the network's hashing power, which would allow the malicious actor to alter one or more previous blocks in the selected chain as described above). Existing blockchain implementations may be susceptible to such an attack. For example, some existing blockchain implementations resolve a fork by identifying the chain after the fork in which the most resources have been burned (e.g., cryptocurrency, energy, etc.). A malicious actor can take advantage of this rule by creating a chain after the fork with one block in which the amount of resources consumed is greater than the amount of resources consumed in another chain after the fork, such as a chain with multiple blocks. Thus, hours of transaction data could be wiped out by the fork being resolved with the selection of a shorter chain (e.g., a chain with one block instead of a chain with 10 blocks).

The improved blockchain implementation disclosed herein, however, can cause forks to be resolved based on the passage of time. For example, the best chain may be the chain that has resisted being reorganized the longest rather than the chain in which the most resources have been consumed. Relying on the longest chain rather than the chain in which the most resources have been consumed can reduce the likelihood that one malicious actor can affect future transactions and/or revise past transactions (e.g., because the malicious actor cannot simply outspend other nodes to resolve the fork in the malicious actor's favor), increasing fairness in the network and preserving a consensus of a majority of the nodes in the network. To determine the longest chain, a node can simply determine which chain has the highest number of blocks. The longest chain can map to the chain that has the highest number of blocks because the stack chain may rely on the burn chain in which blocks are created at fixed intervals (e.g., about every 10 minutes). In some embodiments, the longest chain may also be the chain in which the most resources are consumed, but this is not always the case.

It may be important to manage the rate at which blocks in the stack chain are formed to manage the number of forks that are created (e.g., forks are less likely if nodes are afforded additional time to receive messages broadcast by other nodes before a new block is formed) and to manage the time it takes to confirm transactions (e.g., transactions can be confirmed faster if blocks are created within shorter time intervals). Existing blockchain implementations manage the rate at which blocks are formed using a difficulty associated with the proof of work. However, because relying on the proof of work can introduce the deficiencies described above (e.g., waste of resources, bias in favor of certain nodes, etc.), the improved blockchain implementation described herein can use a different mechanism for managing the rate at which blocks in the stack chain are formed.

For example, the improved blockchain implementation described herein can regulate or manage the rate at which blocks in the stack chain are formed using the cryptocurrency associated with the burn chain. In particular, the nodes can implement the concept of a burn quota. The burn quota may define the amount of cryptocurrency that needs to be burned in order for an election or sortition to commence. If the amount of cryptocurrency that is burned in association with a particular block in the burn chain is less than the burn quota, then no election or sortition occurs in association with that block. Rather, an election or sortition may occur in relation to the next block in the burn chain if the sum of the cryptocurrency burned in the previous block and the next block exceeds the burn quota. The nodes can vary the burn quota itself based on whether an election or sortition occurred or did not occur in a manner such that blocks are formed at a consistent rate.

As described above, the probability that a node is selected as leader of the next block in the stack chain is based on the amount of cryptocurrency that the node burned in relation to a block in the burn chain. In further embodiments, other nodes can increase the probability that a particular node is selected as the leader. For example, a node can submit a user burn transaction in association with a block in the burn chain. The node can submit the user burn transaction without having previously submitting a public key registration transaction. The user burn transaction may reference a block commit submitted by another node, and may indicate an amount of cryptocurrency being burned in the user burn transaction. The amount of cryptocurrency being burned in the user burn transaction can be summed with the amount of cryptocurrency burned in the block commit referenced by the user burn transaction to determine the probability that the node that submitted the block commit is selected as a leader. While the node that submitted the user burn transaction cannot be selected as a leader, the node that submitted the user burn transaction can share in a portion of the block reward awarded to the node selected as the leader. Thus, the improved blockchain implementation described herein allows nodes to form mining pools in which the nodes that are members of a mining pool can work together to improve the chances that one node in the mining pool is selected as a leader and to share in any reward obtained from the node being selected as a leader.

While there are drawbacks to relying on energy consumption to select the leader of the next block in the stack chain, there may be some benefits to implementing a hybrid approach in which energy consumption is one factor in selecting the leader. In further embodiments, the improved blockchain implementation described herein allows nodes to optionally generate a proof of work nonce separate from the proof of work nonce present in the burn chain. Generation of the proof of work nonce requires the consumption of energy, and the value of the proof of work nonce can be mapped to an amount of energy consumption. For example, the value of the proof of work nonce may increment each time a new hash is computed such that the value of the proof of work nonce may indicate how many hashes were computed by the node. Similarly, an amount of energy consumption can be mapped to an amount of a cryptocurrency. For example, the mapping may indicate how much cryptocurrency could have been produced by the node if the consumed energy was instead put to mining the cryptocurrency. Thus, the node can submit a block commit that indicates the separate proof of work nonce and the amount of cryptocurrency burned. Because the separate proof of work nonce can be mapped to an amount of the cryptocurrency, the mapped amount can act as a burn bonus, with the node aggregating the mapped amount and the amount burned (e.g., referred to herein as a work score) to determine a probability of the node being selected as a leader. For example, the node can sum the mapped amount and the amount burned, and the node can use the sum to determine a probability of the node being selected as a leader.

Initially, the improved blockchain implementation described herein can limit the amount of the burn bonus so that blocks in the chain are less vulnerable to malicious actors that may attempt to revise transactions in the chain or otherwise destabilize the chain while the chain is still young (e.g., while the chain has a few blocks). For example, if the burn bonus can be any amount, then a node could unfairly influence (and win) elections by setting up a node with access to a cheap source of energy and/or with a large amount of computing resources and burning a lot of energy. The node could then destroy the chain by refusing to commit any transactions, could revise previous transactions to steal cryptocurrency from other users by revising previous blocks in the chain (e.g., if the node can manage to acquire a majority of the computing power in the network), and/or the like. By limiting the burn bonus, nodes may not necessarily have to compete with mining machines that have access to a cheap source of energy and/or that have a large amount of computing resources. Rather, nodes can still participate in a fair, unbiased election that relies predominately on burning cryptocurrency and in which most computing power is being dedicated to making the existing chain grow. Limiting the burn bonus, therefore, allows for the bootstrapping of a separate proof of work chain without having to start the chain from scratch and without the chain being vulnerable to attacks at an early stage from nodes that otherwise have an unfair resource advantage.

As the chain grows, however, the chain becomes less vulnerable to attack given that the longest chains are considered valid chains if forks occur and a majority of computing power in the network may be dedicated to making this chain grow (and therefore a malicious actor may not be able to accumulate enough computing power to become the majority computing power). Thus, the amount by which the burn bonus can affect the probability that a node is selected as a leader can increase over time. By increasing how much the burn bonus can affect the probability over time rather than leaving the burn bonus be an unlimited amount, participants (e.g., miners) have time to acquire capital (e.g., extra computing resources) that can be allocated to growing the existing chain, thereby reducing the likelihood that a malicious actor would be able to acquire a majority of the computing power in the network (and thereby reducing the likelihood that the chain can be attacked and destroyed by the malicious actor).

By relying partly on energy consumption in selecting a leader of the next block in the stack chain, the improved blockchain implementation described herein may be less reliant on other blockchains over which the nodes of the improved blockchain implementation have no control (e.g., the BITCOIN blockchain, the ETHEREUM blockchain, the LITECOIN blockchain, etc.). The adjustment over time of the burn bonus limit can further reduce the reliance on other blockchains over time.

The foregoing aspects and many of the attendant advantages of this disclosure will become more readily appreciated as the same become better understood by reference to the following detailed description, when taken in conjunction with the accompanying drawings.

Example Improved Blockchain Environment

FIG. 1 is a block diagram of an illustrative operating environment 100 in which an improved blockchain is implemented. The operating environment 100 includes a data plane and a control plane.

Various virtual chain nodes 120A-120F are present in the data plane, along with one or more blockchain data stores 140. Each of the virtual chain nodes 120A-120F may communicate with each other in a decentralized network (e.g., a peer-to-peer network). Each of the virtual chain nodes 120A-120F may further communicate with blockchain data store 140. In general, the virtual chain nodes 120 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. As described in greater detail below, a virtual chain node 120 can launch and execute one or more virtual machine (VM) instances, where each VM instance acts as a node in a decentralized network that implements the virtual chain described herein and can be associated with a user or participant. Thus, the terms "node" and "VM instance" can be used interchangeably.

In particular, each VM instance running on each virtual chain node 120 may store the same information, such as burn chain block information (e.g., data identifying committed transactions, burn chain block header data, etc.), virtual chain block information (e.g., data identifying committed transactions, virtual chain block header data, etc.), etc. The VM instances may store the same information because each VM instance may broadcast a message to other VM instances when a transaction is stored. Because each VM instance receives and stores the same transaction data, each VM instance running on each virtual chain node 120 has a copy of the same virtual chain and/or a copy of the same burn chain. The VM instances can then independently perform the same operations to determine the leader of the next block in the virtual chain, to select a valid fork, to determine whether the burn quota has been satisfied, to implement decentralized fair mining pools, and/or to bootstrap a separate proof of work chain, as described in greater detail below.

As an illustrative example, a first VM instance running on the virtual chain node 120A may execute a series of operations to conduct a single-leader election and select the leader of the next block in a virtual chain. Similarly, a second VM instance running on the virtual chain node 120A may execute the same operations to conduct a single-leader election and select the same leader for the next block in the virtual chain, a first VM instance running on the virtual chain node 120B may execute the same operations to conduct a single-leader election and select the same leader for the next block in the virtual chain, and so on.

A virtual chain node 120 can launch and execute a VM instance as a standalone application. Alternatively, a virtual chain node 120 can run an application within which the VM instance is launched and executed. For example, the application can be a mobile application.

While FIG. 1 illustrates six virtual chain nodes 120A-F in the operating environment 100, this is merely for illustrative purposes. The operating environment 100 may include fewer or more virtual chain nodes 120.

The blockchain data store 140 may store various data of the virtual chain. For example, the blockchain data store 140 can store rules or instructions that define how single-leader elections are conducted, transactions that may be stored in a block, information to include in transactions (e.g., information to include in a public key registration transaction, a block commit transaction, a user burn transaction, etc.), the underlying blockchain to use as the burn chain, the type of cryptocurrency that is burned or destroyed during an election, how a burn quota is adjusted, a current burn bonus limit, a mapping between a proof of work nonce value and an amount of energy consumed, a mapping between an amount of energy consumed and an amount of a type of cryptocurrency, a mapping between a proof of work nonce value and an amount of a type of cryptocurrency, and/or the like. The blockchain data store 140 can also store data specific to various virtual chain nodes 120 and/or VM instances running thereon. Data specific to a virtual chain node 120 and/or a VM instance may be signed with a private key associated with the virtual chain node 120 and/or the VM instance.

The control plane may include two blockchains. In general, a blockchain is a global append-only log. Writes to the global append-only log are called transactions, and transactions are organized into blocks. Thus, each block can include or package a single transaction or multiple transactions. Writing to the global append-only log (e.g., writing to a block) requires a payment in the form of a transaction fee. Nodes participating in the blockchain network follow a leader election protocol (e.g., a single-leader election protocol) for deciding which node gets to write the next block in the blockchain. The node that gets to write the next block in the blockchain may be awarded a block reward (e.g., in the form of cryptocurrency) and can collect the transaction fees for the transactions that will be written to this next block.

The first blockchain in the control plane is a burn chain, and the second blockchain in the control plane is a virtual chain (also referred to herein as a "stack chain") that relies on the burn chain. For example, the burn chain may be an existing blockchain, such as a BITCOIN blockchain, an ETHEREUM blockchain, etc. The burn chain may include one or more burn chain blocks 130, where each burn chain block 130 references a parent of the burn chain block 130. Thus, the burn chain blocks 130 may form a chain of blocks, with each burn chain block 130 encoding one or more transactions corresponding to the burn chain.

The virtual chain may be referred to as a "virtual chain" because the virtual chain may reside or lay on top of the burn chain. The virtual chain may include one or more virtual chain blocks 132 that are each anchored to a burn chain block 130. Like the burn chain blocks 130, the virtual chain blocks 132 may reference a parent block and therefore form a chain of blocks, and the virtual chain blocks 132 may each encode one or more transactions corresponding to the virtual chain. However, the burn chain may have a first cryptocurrency base (e.g., transactions are executed in the burn chain using the first cryptocurrency), and the virtual chain may have a different, second cryptocurrency base (e.g., transactions are executed in the virtual chain using the second cryptocurrency). While the virtual chain blocks 132 and the burn chain blocks 130 form separate blockchains, the formation of a virtual chain block 132 may rely on transactions encoded in the burn chain blocks 130. For example, a VM instance can use one or more transactions encoded in the burn chain blocks 130 to determine the leader of the next virtual chain block 132, as described in greater detail below.

The burn chain blocks 130 and the virtual chain blocks 132 may each be data structures comprised of a block header and transaction data. The block header may include various data, such as a reference to the immediately preceding block in the blockchain (e.g., a reference to the parent of the block, where the reference may be a hash of the header of the immediately preceding block in the blockchain), a Merkle root (e.g., a hash of all the hashes of the transactions stored in the block), a proof of work nonce, a VRF proof, and/or a timestamp.

Figure 2:
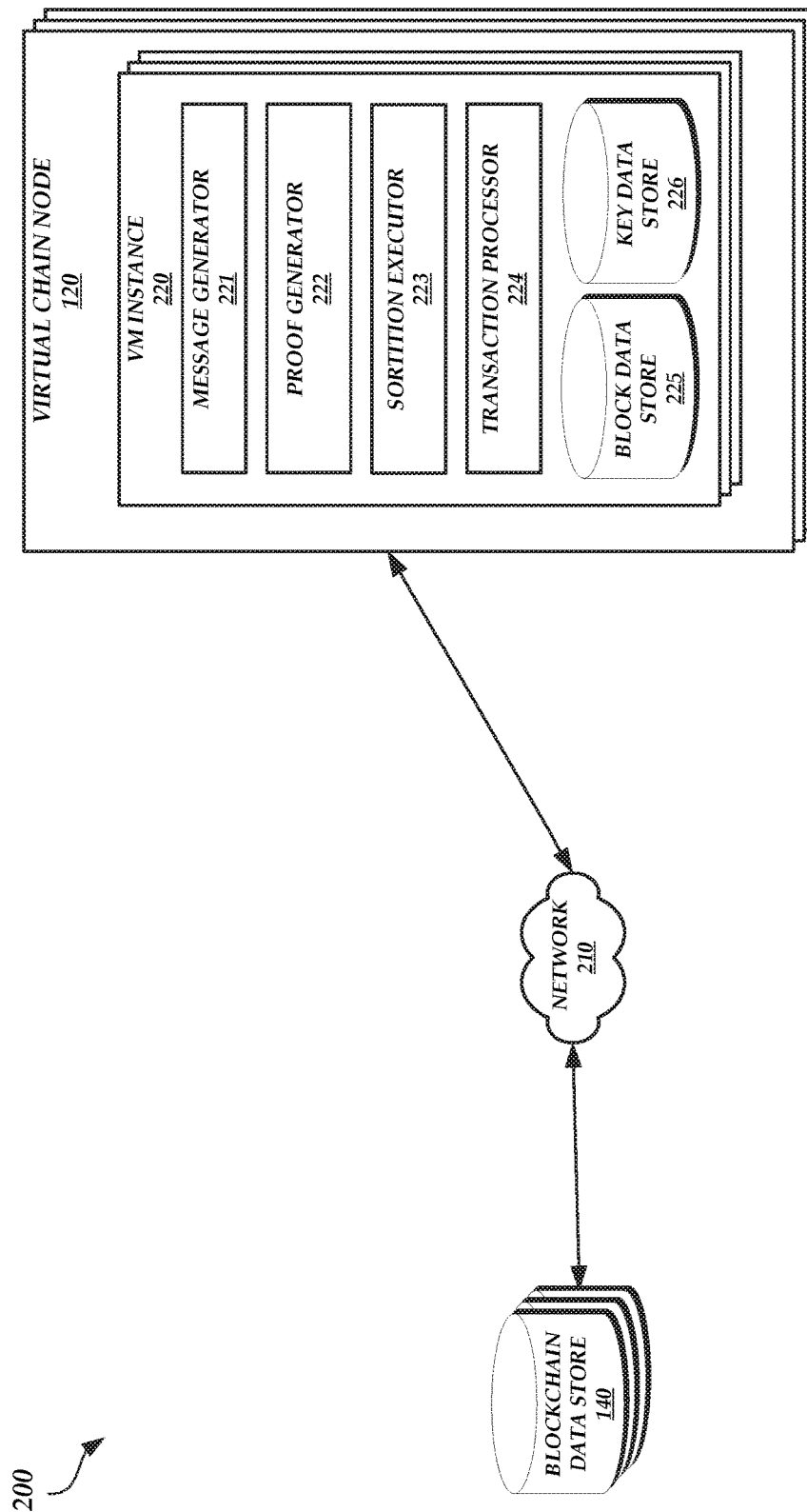
FIG. 2 is a block diagram of an illustrative operating environment in which an improved blockchain is implemented via one or more VM instances.

FIG. 2 is a block diagram of an illustrative operating environment 200 in which an improved blockchain is implemented via one or more VM instances 220. The operating environment 200 includes various virtual chain nodes 120 in communication with one or more blockchain data stores 140 via network 210. In addition, some or all of the virtual chain nodes 120 may communicate with each other via the network 210.

The network 210 may include any wired network, wireless network, or combination thereof. For example, the network 210 may be a personal area network, local area network, wide area network, over-the-air broadcast network (e.g., for radio or television), cable network, satellite network, cellular telephone network, or combination thereof. As a further example, the network 210 may be a publicly accessible network of linked networks, possibly operated by various distinct parties, such as the Internet. In some embodiments, the network 210 may be a private or semi-private network, such as a corporate or university intranet. The network 210 may include one or more wireless networks, such as a Global System for Mobile Communications (GSM) network, a Code Division Multiple Access (CDMA) network, a Long Term Evolution (LTE) network, or any other type of wireless network. The network 210 can use protocols and components for communicating via the Internet or any of the other aforementioned types of networks. For example, the protocols used by the network 210 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

As described above, each virtual chain node 120 can launch and execute one or more VM instances 220. The VM instance 220 may include various components to implement the improved blockchain described herein. For example, the VM instance 220 may include a message generator 221, a proof generator 222, a sortition executor 223, a transaction processor 224, a block data store 225, and a key data store 226.

The message generator 221 of a VM instance 220 may generate a message that is eventually used to derive a VRF proof for the VM instance 220. For example, the message generator 221 may generate the message by hashing a VRF proof present in a previous block in the virtual chain (e.g., a block that may become a parent to a new block to be formed in the virtual chain). In particular, the VRF proof of the previous block in the virtual chain may be present in the header of the previous block. The message generator 221 may obtain the VRF proof of the previous block by retrieving the data structure of the previous block from the block data store 225 and obtaining the VRF proof from the header portion of the data structure.

The proof generator 222 of a VM instance 220 can generate a VRF proof for the VM instance 220. For example, the proof generator 222 can obtain a private key of the VM instance 220 from the key data store 226, and can use the message and the obtained private key to generate the VRF proof. Because the VRF proof is based, at least in part, on the private key, the VRF proof of each VM instance 220 should be different. In addition, because the VRF proof is based, at least in part, on the message (and therefore the VRF proof of a previous block), each separate VRF proof generated by the proof generator 222 should be different. In general, the proof generator 222 may generate a new VRF proof each time the VM instance 220 is attempting to submit a block commit transaction in association with a different block in the burn chain.

The proof generator 222 may also be configured to generate a proof of work nonce that is separate from the proof of work nonce stored in the header of a burn chain block 130. For example, a difficulty level may be set by another VM instance 220 and/or stored in the blockchain data store 140. The proof generator 222 may attempt to find a proof of work nonce value that, when hashed with a header of a previous virtual chain block 132 in the virtual chain, yields a hash value that is less than a certain threshold value defined by the difficulty level (e.g., a threshold value that has a certain number of leading 0s defined by the difficulty level). In some embodiments, the proof generator 222 starts hashing the proof of work nonce and the header with the proof of work nonce having a value of 0, and increments the proof of work nonce value (e.g., by 1, by 10, by a random value, etc.) each time the hash does not yield a hash value less than the threshold value until a hash value that is less than the threshold value is found. In other embodiments, the proof generator 222 starts hashing the proof of work nonce and the header with the proof of work nonce having a value of $2^{256}-1$, and decrements the proof of work nonce value (e.g., by 1, by 10, by a random value, etc.) each time the hash does not yield a hash value less than the threshold value until a hash value that is less than the threshold value is found. In still other embodiments, the proof generator 222 starts hashing the proof of work nonce and the header with the proof of work nonce having a random value, and increments and/or decrements the proof of work nonce value (e.g., by 1, by 10, by a random value, etc.) each time the hash does not yield a hash value less than the threshold value until a hash value that is less than the threshold value is found.

The sortition executor 223 can perform a single-leader election using the message generated by the message generator 221 and a proof of work nonce obtained from a header of a burn chain block 130. For example, the sortition executor 223 can receive messages from one or more other VM instances 220 (e.g., other transaction processors 224) indicating that these other VM instance(s) 220 have submitted block commit transactions in association with a particular burn chain block 130 and providing the corresponding transaction data. The sortition executor 223 can use the transaction data to determine a probability associated with each VM instance 220 that submitted a block commit transaction in association with the particular burn chain block 130. In particular, the block commit transaction data may indicate an amount of a cryptocurrency burned by each VM instance 220 that submitted a block commit transaction in association with the particular burn chain block 130. Optionally, the sortition executor 223 can sum the total amount of cryptocurrency burned by each VM instance 220 that submitted a block commit transaction in association with the particular burn chain block 130. The sortition executor 223 can then compare the sum to a burn quota. If the sum is equal to or exceeds the burn quota, the sortition executor 223 continues with the sortition. However, if the sum is less than the burn quota, the sortition executor 223 stops and no sortition occurs in association with the particular burn chain block 130. Rather, a sortition may occur in association with a subsequent burn chain block 130, as described in greater detail below. Having the occurrence of a sortition be dependent on whether the sum is equal to or exceeds the burn quota is optional, as a sortition can occur regardless of whether the sum would be equal to or exceed the burn quota.

If the sortition executor 223 sums the total amount of cryptocurrency burned, compares the sum to the burn quota, and determines that the sum is equal to or exceeds the burn quota or once the sum is complete (e.g., if the burn quota is not used to control sortition occurrence), the sortition executor 223 then determines the percentage of the sum that was burned by each of the VM instance(s) 220 that submitted the block commit transaction. The sortition executor 223 can assign each VM instance 220 the determined percentage, which represents the likelihood that the respective VM instance 220 will be selected as the leader of the next virtual chain block 132.

The sortition executor 223 can generate a value that is used to select the leader of the next virtual chain block 132. The value may fall within a certain range, such as 0 to $2^{256}-1$ if 256 bit encryption is being used. Because the value can fall within a certain range, the sortition executor 223 can assign different portions or intervals of the range to the VM instance(s) 220 that submitted the block commit transaction in association with the particular burn chain block 130. The percentage of the range assigned to a VM instance 220 may be equivalent to a percentage of the sum that was burned by the VM instance 220. The range assigned to the VM instance 220 can be contiguous or non-contiguous. For example, if a VM instance 220 burned 20% of the sum, the VM instance 220 may be assigned 20% of the range. The sortition executor 223 can assign the VM instance 220 the first 20% of the range, the last 20% of the range, a middle 20% of the range, 10% of the first half of the range and 10% of the second half of the range, and/or the like. The portion of a range to assign to a VM instance may be defined by a rule stored in the blockchain data store 140.

To generate the value, the sortition executor 223 can first sum the message and the proof of work nonce obtained from the header of the burn chain block 130 within which the block commit transactions that led to this sortition are stored. Alternatively, the sortition executor 223 can hash or otherwise combine the message and the proof of work nonce obtained from the header of the burn chain block 130 within which the block commit transactions that led to this sortition are stored. Once combined, the sortition executor 223 can compute the combination modulo $2^{256}-1$ to generate the value. The modulo operation may ensure that the generated value does not fall outside the 0 to $2^{256}-1$ range and can obscure the resulting value that will be used to select the leader. The sortition executor 223 then selects the VM instance 220 assigned to the portion of the range within which the generated value falls as the leader of the next virtual chain block 132, where the next virtual chain block 132 will be anchored to the burn chain block 130 for which the sortition was conducted. The sortition executor 223 or another component (e.g., the transaction processor 224) can provide a block reward to the selected VM instance 220 (e.g., by storing a transaction indicating that the block reward has been sent to the selected VM instance 220).

In further embodiments, the sortition executor 223 takes into account user burn transactions in determining the leader of the next virtual chain block 132. For example, a user burn transaction submitted by one VM instance 220 can indicate an amount of cryptocurrency that is burned or destroyed by the VM instance 220 and can reference a block commit transaction submitted by another VM instance 220. The sortition executor 223 can receive messages from one or more other VM instances 220 (e.g., other transaction processors 224) indicating that these other VM instance(s) 220 have submitted block commit transactions and/or user burn transactions in association with a particular burn chain block 130 and providing the corresponding transaction data. The sortition executor 223 can use the transaction data to determine a probability associated with each VM instance 220 that submitted a block commit transaction in association with the particular burn chain block 130. In particular, the block commit transaction data may indicate an amount of a cryptocurrency burned by each VM instance 220 that submitted a block commit transaction in association with the particular burn chain block 130. The user burn transaction data may indicate an amount of a cryptocurrency burned on behalf of each VM instance 220 that submitted a block commit transaction in association with the particular burn chain block 130. Optionally, the sortition executor 223 can sum the total amount of cryptocurrency burned by each VM instance 220 that submitted a block commit transaction in association with the particular burn chain block 130 and each VM instance 220 that submitted a user burn transaction in association with the particular burn chain block 130. The sortition executor 223 can then compare the sum to a burn quota. If the sum is equal to or exceeds the burn quota, the sortition executor 223 continues with the sortition. However, if the sum is less than the burn quota, the sortition executor 223 stops and no sortition occurs in association with the particular burn chain block 130. Rather, a sortition may occur in association with a subsequent burn chain block 130, as described in greater detail below. Having the occurrence of a sortition be dependent on whether the sum is equal to or exceeds the burn quota is optional, as a sortition can occur regardless of whether the sum would be equal to or exceed the burn quota.

If the sortition executor 223 sums the total amount of cryptocurrency burned, compares the sum to the burn quota, and determines that the sum is equal to or exceeds the burn quota or once the sum is complete (e.g., if the burn quota is not used to control sortition occurrence), the sortition executor 223 then determines the percentage of the sum that is allocated to a VM instance 220 that submitted a block commit transaction. The percentage of the sum allocated to a VM instance 220 may be a sum of (1) the percentage of the sum burned by the VM instance 220 that submitted the block commit transaction and (2) the percentage of the sum burned by VM instance(s) 220 on behalf of the VM instance 220 that submitted the block commit transaction. The sortition executor 223 can assign each VM instance 220 the allocated percentage, which represents the likelihood that the respective VM instance 220 will be selected as the leader of the next virtual chain block 132. The sortition executor 223 can then conduct the sortition in a manner as described above.

The sortition executor 223 or another component (e.g., the transaction processor 224) can provide a block reward to the VM instance 220 selected as the leader and the VM instance(s) 220, if any, that submitted user burn transactions on behalf of the VM instance 220 selected as the leader (e.g., by storing transaction(s) indicating that the block reward has been sent to the VM instance(s) 220). For example, the sortition executor 223 or another component can sum the amount of cryptocurrency burned or destroyed by the VM instance 220 selected as the leader and by the VM instance(s) 220 that submitted user burn transactions on behalf of the leader. The sortition executor 223 or another component can then determine the percentage of the sum contributed by each VM instance 220, and reward each VM instance 220 with a proportion of the block reward equal to the contributed percentage.

In further embodiments, the sortition executor 223 takes into account burn bonuses in determining the leader of the next virtual chain block 132. For example, a VM instance 220 can submit a block commit transaction that indicates an amount of cryptocurrency that is being burned or destroyed and a proof of work nonce separate from the proof of work nonce present in the burn chain. The sortition executor 223 can convert the proof of work nonce into an equivalent amount of cryptocurrency, and sum the burned cryptocurrency amount and the equivalent cryptocurrency amount to form a work score. If the percentage of the work score contributed by the equivalent cryptocurrency amount is equal to or less than a defined burn bonus limit (e.g., 5%, 10%, etc.), then the sortition executor 223 can use the work score as the effective amount of cryptocurrency burned or destroyed by the VM instance 220 for the purpose of conducting the sortition. If the percentage of the work score contributed by the equivalent cryptocurrency amount is greater than the defined burn bonus limit, then the sortition executor 223 may reduce the equivalent cryptocurrency amount (and thus the work score) until the percentage of the work score contributed by the reduced equivalent cryptocurrency amount is equal to or less than the defined burn bonus limit. Thus, the percentage of the work score contributed by the equivalent cryptocurrency may be capped at a set percentage. The sortition executor 223 can then use the sum of the burned cryptocurrency amount and the reduced equivalent cryptocurrency amount (e.g., the work score) as the effective amount of cryptocurrency burned or destroyed by the VM instance 220 for the purpose of conducting the sortition.

The transaction processor 224 can broadcast various messages indicating that a transaction has been stored or executed. For example, the transaction processor 224 of a VM instance 220 can broadcast that the VM instance 220 has submitted a public key registration transaction, a block commit transaction, a user burn transaction, and/or any virtual chain transaction. The transaction processor 224 can generate the transactions themselves (e.g., by obtaining data from other components), specifying an amount of cryptocurrency that is burned, a separate proof of work nonce, a block commit associated with the transaction (e.g., in the case of a user burn transaction), a burn chain block 130 associated with the transaction (e.g., for a public key registration transaction, a block commit transaction, and a user burn transaction), a virtual chain block 132 associated with the transaction (e.g., for a virtual chain transaction), and/or the like.

The transaction processor 224 of a VM instance 220 can also process block rewards received as a result of the VM instance 220 being selected as a leader and/or as a result of the VM instance 220 submitting a user burn transaction that contributed to another VM instance 220 being selected as a leader. The transaction processor 224 of a VM instance 220 may also process transaction fees received as a result of the VM instance 220 being selected as a leader.

The block data store 225 can store burn chain block 130 data and/or virtual chain block 132 data. For example, the block data store 225 can store block header data and transaction data for burn chain blocks 130 and/or virtual chain blocks 132. While the block data store 225 is depicted as being internal to a VM instance 220, this is not meant to be limiting. For example, the block data store 225 may reside internal to the virtual chain node 120, but external to the VM instances 220. In this example, the VM instances 220 may share access to the block data store 225.

The key data store 226 can store public and private keys of a VM instance 220. While the key data store 226 is depicted as being internal to a VM instance 220, this is not meant to be limiting. For example, the key data store 225 may reside internal to the virtual chain node 120, but external to the VM instances 220. In this example, the VM instances 220 may share access to the key data store 225, and the key data store 225 may store public and private keys for each of the VM instances 220.

While the VM instance 220 is described herein as implementing the functionality of a miner, a user's wallet, and a sortition executor, this is not meant to be limiting. For example, in one embodiment, the VM instance 220 can perform the functionality of the message generator 221, the proof generator 222, the sortition executor 223, and the transaction processor 224 as described herein. Thus, the VM instance 220 can generate a message, can generate a VRF proof, can generate a proof of work nonce, can perform a single-leader election, can generate and submit transactions and combine transactions into a block, and can process block rewards and/or transaction fees.

In another embodiment, the user's wallet functionality and the miner functionality are performed by components separate from the VM instance 220. For example, a computing device separate from a virtual chain node 120 operated by a miner may be a client to the peer network. This separate computing device can generate a message, generate a VRF proof, can generate a proof of work nonce, and can validate and combine virtual chain transactions into a block in the virtual chain and/or a block in the burn chain. Another separate computing device that is a client to the peer network can function as a user's wallet. For example, the user's wallet computing device can generate virtual chain transactions (e.g., public key registration transactions, block commit transactions, burn transaction, etc.) using data obtained from the miner computing device. The miner computing device can obtain transactions generated by the user's wallet computing device, and validate and combine the transactions into a virtual chain or burn chain block. Thus, the miner computing device may include the message generator 221, the proof generator 222, and the functionality of the transaction processor 224 that processes/validates and submits transactions and processes block rewards and/or transaction fees, the user's wallet computing device may include the functionality of the transaction processor 224 that generates transactions, and the VM instance 220 may simply include the sortition executor 223. Because multiple miners and users may be present in the environment, multiple miner computing devices and/or multiple user's wallet computing devices may be clients to the peer network.

In this embodiment, the proof generator 222 of the miner computing device then generates a VRF proof for the miner computing device, the transaction processor 224 of the user's wallet computing device generates a block commit transaction (or a user burn transaction) using the generated VRF proof, and the transaction processor 224 of the miner computing device submits the block commit transaction (or the user burn transaction). The VM instance 220 (e.g., the sortition executor 223) can take as input block commit and/or user burn transactions submitted by one or more miner computing devices, perform a single-leader election as described herein, and output an indication of the selected leader (e.g., output the public key of the miner selected as the leader, as extracted from a previously submitted public key registration transaction). As part of selecting the leader, the VM instance 220 may verify that the hash of the VRF proof included in the block commit transaction submitted by the selected leader (e.g., by the computing device operated by a miner) is valid by obtaining the public key of the selected leader from the submitted public key registration transaction, obtaining the message included in the header of the previous block in the virtual chain, obtaining the hash of the VRF proof from the block commit transaction, and using the public key, the message, and the hash of the VRF proof to produce a true value (e.g., which indicates that the hash of the VRF proof is valid) or a false value (e.g., which indicates that the hash of the VRF proof is invalid).

Accordingly, the functionality of the VM instance 220 described herein can all be performed by the VM instance 220, or portions of the functionality can be performed by the VM instance 220 and other portions of the functionality can be performed by one or more separate computing devices.

Single-Leader Election Algorithm

Figure 3:
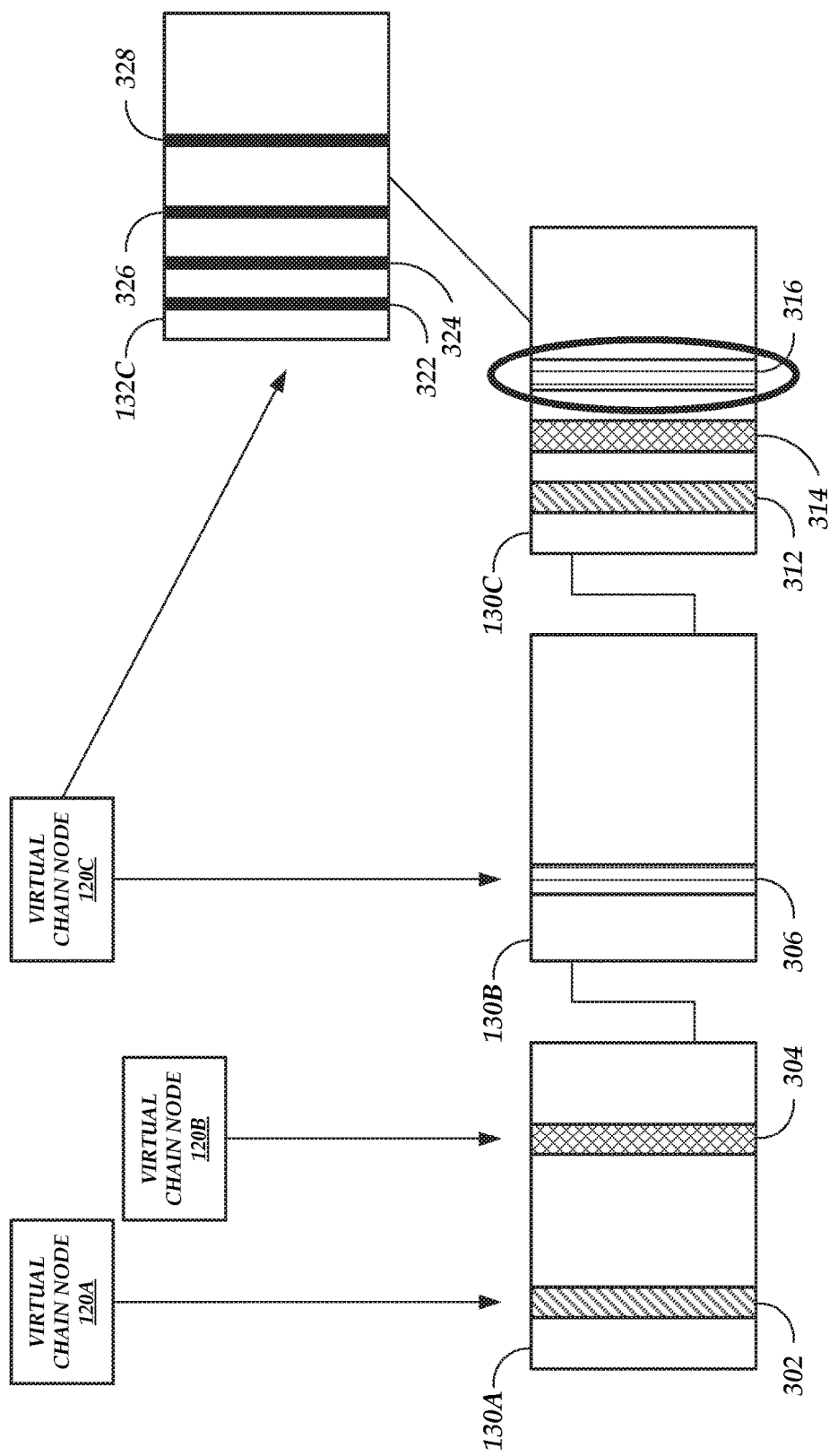
FIG. 3 is a block diagram depicting a process by which various virtual chain nodes of FIG. 1 can participate in a single-leader election for the right to form a new virtual chain block.

FIG. 3 is a block diagram depicting a process by which various virtual chain nodes 120A-120C can participate in a single-leader election for the right to form a new virtual chain block 132C. As illustrated in FIG. 3, a VM instance 220 running on the virtual chain node 120A has submitted a public key registration transaction 302 in burn chain block 130A. The public key registration transaction 302 may include a public key of the VM instance 220 running on the virtual chain node 120A (which may be the public key of the virtual chain node 120A if a single VM instance is running on the virtual chain node 120A).

Similarly, a VM instance 220 running on the virtual chain node 120B has submitted a public key registration transaction 304 in the burn chain block 130A. The public key registration transaction 304 may include a public key of the VM instance 220 running on the virtual chain node 120B.

Because the VM instances 220 running on the virtual chain nodes 120A-120B have submitted public key registration transactions in association with the burn chain block 130A, these VM instances 220 can begin participating in elections that occur in association with any burn chain block 130 that is a child of the burn chain block 130A. For example, these VM instances 220 running on virtual chain nodes 120A-120B can participate in an election that occurs in association with burn chain block 130B (which is a child block of the burn chain block 130A) or can participate in an election that occurs in association with burn chain block 130C (which is a child block of the burn chain block 130B).

A VM instance 220 running on the virtual chain node 120C may submit a public key registration transaction 306 in the burn chain block 130B. The public key registration transaction 306 may include a public key of the VM instance 220 running on the virtual chain node 120B. Thus, the VM instance 220 running on the virtual chain node 120C can participate in an election that occurs in association with any burn chain block 130 that is a child of the burn chain block 130B (e.g., the burn chain block 130C).

As described herein, a VM instance 220 submits a block commit transaction in association with a burn chain block 130 to participate in an election associated with the burn chain block 130. Here, the VM instance 220 running on the virtual chain node 120A submits a block commit transaction 312 in association with the burn chain block 130C. Similarly, the VM instance 220 running on the virtual chain node 120B submits a block commit transaction 314 in association with the burn chain block 130C, and the VM instance 220 running on the virtual chain node 120C submits a block commit transaction 316 in association with the burn chain block 130C. Each of the block commit transactions 312, 314, and 316 may indicate an amount of cryptocurrency that has been burned and may include a hash of the VRF proof of the respective VM instance 220.

Each virtual chain node 120A-120C and/or other virtual chain nodes 120 may independently conduct a sortition based on the block commit transactions 312, 314, and 316 to determine a leader of virtual chain block 132C, which may be the next block in the virtual chain and which may be anchored to the burn chain block 130C (e.g., anchored to the block in the burn chain for which a sortition is occurring). The VM instances 220 running on the virtual chain nodes 120A-120C may each have a probability of being selected as a leader that is based on the amount of cryptocurrency burned in the respective block commit transactions 312, 314, and 316.

Here, the VM instance 220 running on the virtual chain node 120C is selected as the leader of the virtual chain block 132. Thus, the VM instance 220 running on the virtual chain node 120C is awarded a block reward and can obtain transaction fees for each transactions stored on the virtual chain block 132C. For example, the VM instance 220 running on the virtual chain node 120C can obtain transaction fees for various transactions 322, 324, 326, and 328 that are stored or encoded in the virtual chain block 132C.

Because the VM instance 220 running on the virtual chain node 120C is selected as the leader of the virtual chain block 132C, the VM instance 220 running on the virtual chain node 120C may forms the virtual chain block 132C by inserting a VRF proof generated by the VM instance 220 (or a hash of the VRF proof, which is a message) into a header of the virtual chain block 132C. The VRF proof can then be used to perform a future sortition, as described in greater detail below.

Alternatively, as described above in an embodiment in which separate miner computing devices are present, the functionality described herein with respect to FIG. 3 can be performed by the miner computing devices and the VM instance 220. For example, the VM instance 220 running on a virtual chain node 120 can select the leader of the virtual chain block 132C, and miner computing devices can perform the remaining functionality (e.g., a first miner computing device can submit the public key registration 302 and the block commit transaction 312, a second miner computing device can submit the public key registration 304 and the block commit transaction 314, a third miner computing device can submit the public key registration 306 and the block commit transaction 316, and the VM instance 220 can select one of the miner computing devices as the leader).

Figure 4:
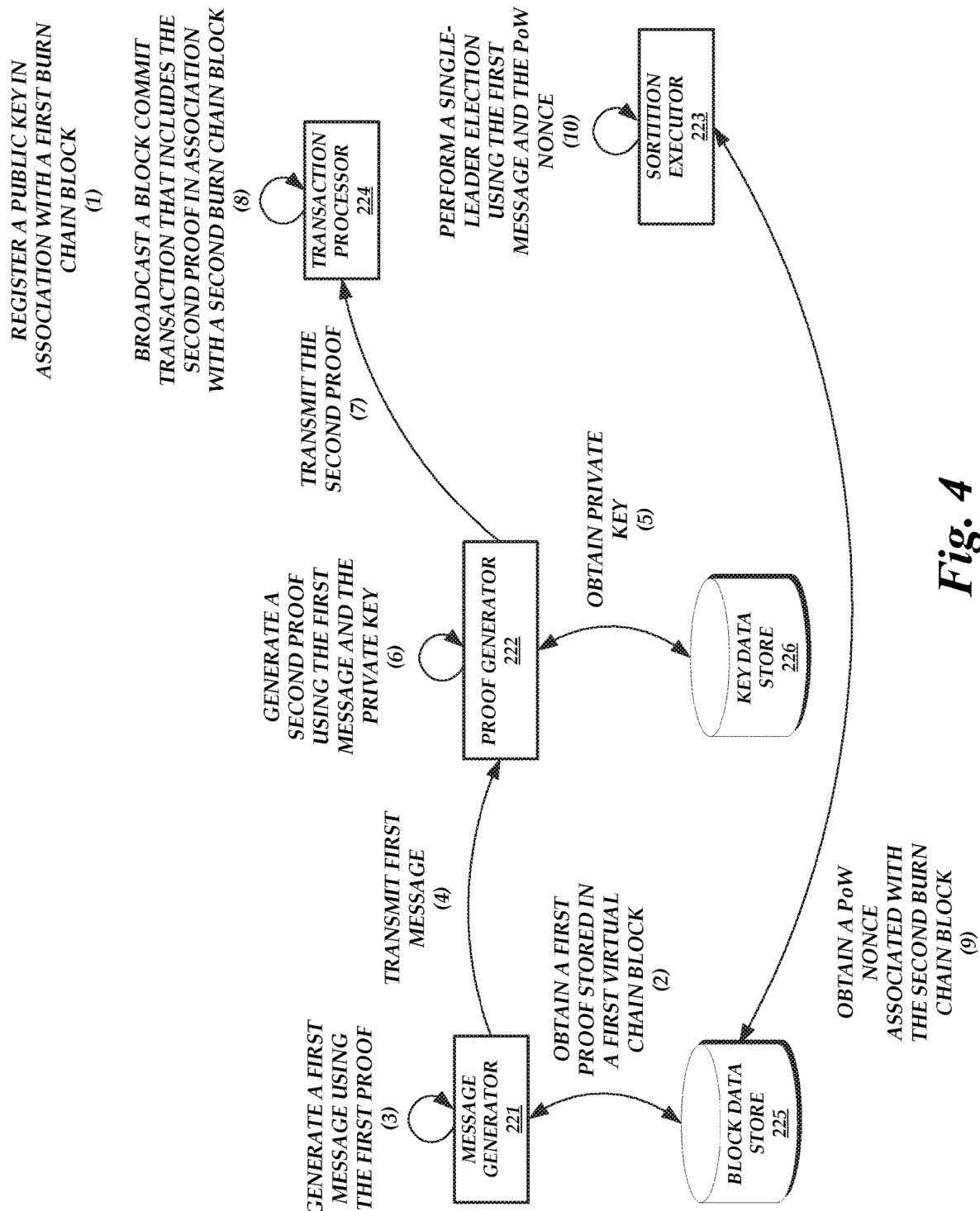
FIG. 4 is a flow diagram illustrating the operations performed by the components of the operating environment of FIG. 2 to perform a single-leader election for selecting the leader of the next block in the virtual chain.

FIG. 4 is a flow diagram illustrating the operations performed by the components of the operating environment 200 of FIG. 2 to perform a single-leader election for selecting the leader of the next block in the virtual chain. As illustrated in FIG. 4, the transaction processor 224 registers a public key in association with a first burn chain block at (1). For example, the transaction processor 224 may submit a public key registration transaction in association with the first burn chain block. Thus, the corresponding VM instance 220 (or miner computing device) can participate in an election starting with the next block in the burn chain.

To participate in an election, the VM instance 220 (or miner computing device) may need to submit a block commit transaction. To do so, the message generator 221 may obtain a first proof stored in a first virtual chain block from the block data store 225 at (2). For example, the first proof may be a VRF proof stored in a header of the first virtual chain block. In some embodiments, the first virtual chain block may be anchored to the first burn chain block. Generally, if the VM instance 220 is attempting to participate in an election to be chosen as the leader of the next block in the virtual chain, the message generator 221 may obtain the VRF proof stored in the previous virtual chain block (e.g., the block in the virtual chain that will become the parent block of the next block in the virtual chain).

The message generator 221 can then generate a first message using the first proof at (3). For example, the message generator 221 can hash the first proof to form the first message. Once the first message is generated, the message generator 221 can transmit the first message to the proof generator 222 at (4).

The proof generator 222 can obtain a private key from the key data store 226 at (5). The proof generator 222 can then generate a second proof using the first message and the private key at (6). For example, the second proof may be a VRF proof unique or specific to the VM instance 220 of the proof generator 222 (e.g., a VRF proof unique or specific to a node). The proof generator 222 can generate the second proof by performing an elliptic curve algorithm (e.g., algebraic operations performed on elliptic curve points), which includes generating a hash of the message and the private key. Because generation of the second proof (e.g., a VRF proof) relies on a node's private key, each node participating in the election may generate a different VRF proof.

Once the second proof is generated, the proof generator 222 can transmit the second proof to the transaction processor 224 at (7). The transaction processor 224 can then generate and broadcast a block commit transaction that includes a hash of the second proof in association with a second burn chain block at (8) (where the proof generator 222 or the transaction processor 224 can generate the hash of the second proof). For example, the first burn chain block may be a parent block of the second burn chain block, and therefore the VM instance 220 can participate in the election occurring in association with the second burn chain block because the public key was registered in association with the first burn chain block. The block commit transaction may indicate an amount of cryptocurrency burned or destroyed, where the type of cryptocurrency is based on the coinbase of the burn chain. The transaction processor 224 can broadcast the block commit transaction to one or more nodes (e.g., one or more VM instances 220) participating in the improved blockchain network.

Various VM instances 220 may broadcast messages indicating that block commit transactions have been executed in embodiments in which the VM instances 220 also implement miner functionality (e.g., separate miner computing devices are not present in the network environment). In embodiments in which the VM instances 220 do not implement miner functionality (e.g., separate miner computing devices are present in the network environment), the VM instances 220 may not need to communicate as the information needed to execute the same sortition may be found in the burn chain blocks and the VM instances 220 can simply identify transactions using the burn chain blocks. The sortition executor 223 can obtain these messages, and use data included in the messages to perform a single-leader election. For example, the sortition executor 223 can obtain, from the block data store 225, a proof of work (PoW) nonce associated with the second burn chain block at (9). For example, the PoW nonce may be present in a header of the second burn chain block (e.g., in a header portion of the second burn chain block data structure).

The sortition executor 223 can then perform a single-leader election using the first message and the PoW nonce at (10). For example, the sortition executor 223 can use the messages broadcast by the various VM instances 220 to determine an amount of cryptocurrency burned by each of the VM instances 220 in association with the second burn chain block. The sortition executor 223 can use the amounts to determine a probability that a given VM instance 220 should be selected as a leader (e.g., the probability that a given VM instance 220 should be selected as a leader may be determined to be equivalent to a percentage of the total amount burned that was burned by the respective VM instance 220). The sortition executor 223 can then assign each VM instance 220 a portion of a range of values, where the length of the portion corresponds to the determined probability for the respective VM instance 220. The sortition executor 223 can sum, hash, or otherwise combine the first message and the PoW nonce, and compute the combination modulo $2^{256}-1$ to determine a sortition value. The VM instance 220 assigned a portion of the range of values within which the sortition value falls is then selected as the leader of the next virtual chain block (e.g., a second virtual chain block that references the first virtual chain block as a parent block).

The VM instance 220 (or miner computing device) selected as the leader of the next virtual chain block may obtain a block reward for being selected as the leader. The block reward may be in the form of a cryptocurrency that is different than the cryptocurrency that was burned or destroyed. For example, the block reward cryptocurrency may be based on the coinbase of the virtual chain.

The VM instance 220 (or miner computing device) selected as the leader of the next virtual chain block may form the next virtual chain block by inserting the second proof (e.g., the VRF proof) generated by the VM instance 220 (and the hash of which is included in the winning block commit transaction) in a header of the next virtual chain block. Thus, this VM instance 220 and/or other VM instances 220 can use the second proof to form a second message that will then be used to select the next leader of the virtual chain block that will follow the next block for which a leader was just chosen.

Figure 5:
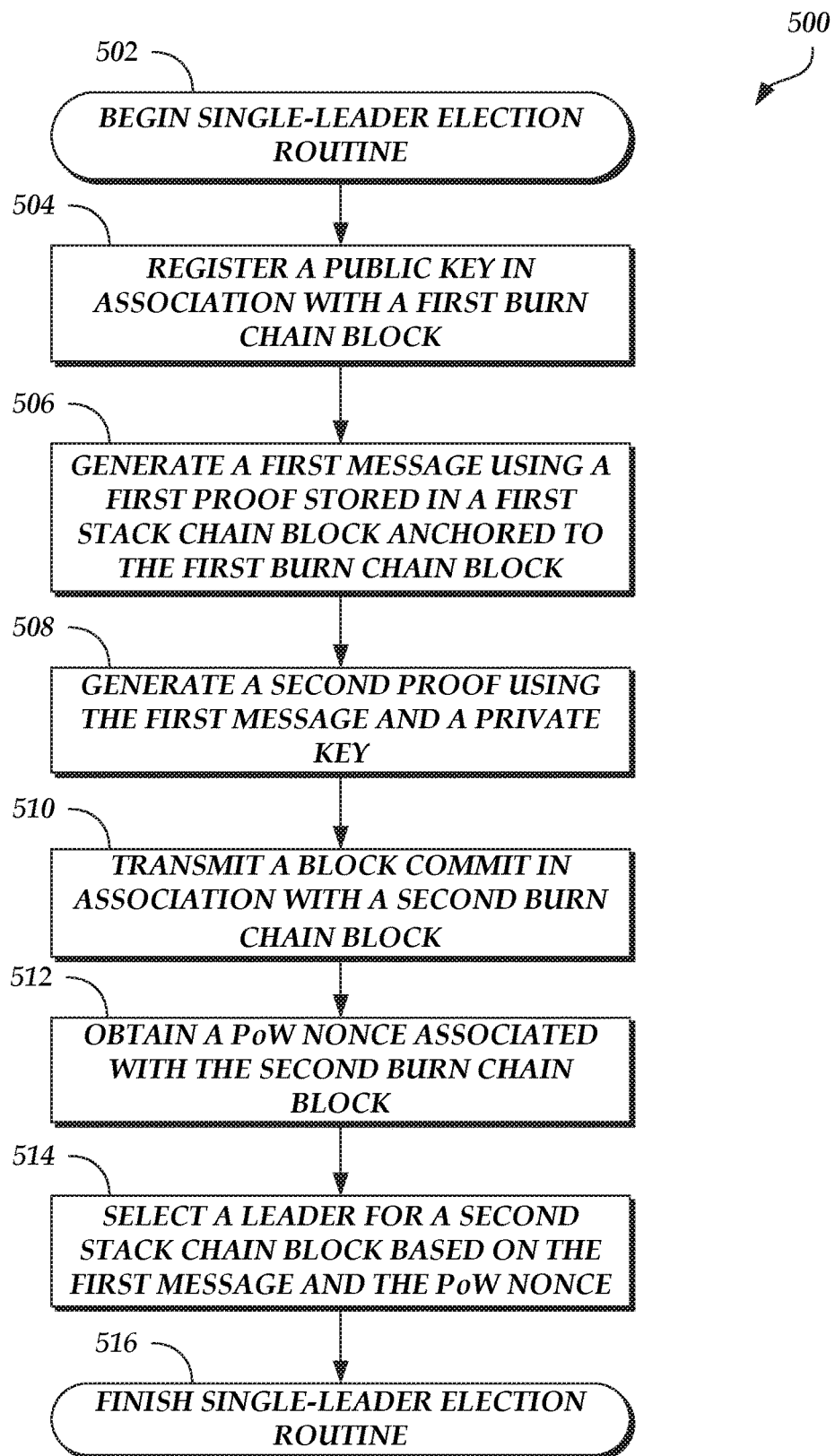
FIG. 5 is a flow diagram depicting a single-leader election routine illustratively implemented by a node, according to one embodiment.

FIG. 5 is a flow diagram depicting a single-leader election routine 500 illustratively implemented by a node, according to one embodiment. As an example, the virtual chain node 120 of FIG. 1, or a single VM instance 220 running on a virtual chain node 120, can be configured to execute the single-leader election routine 500. Alternatively, a combination of a VM instance 220, a user's wallet computing device, and/or a miner computing device can be configured to execute the single-leader election routine 500. The single-leader election routine 500 begins at block 502.

At block 504, a public key is registered in association with a first burn chain block. For example, the public key that is registered may be a counterpart key to a private key that will eventually be used by the node to generate a VRF proof. Thus, the VRF proof can be independently verified by any node using the public key that was previously registered.

At block 506, a first message is generated using a first proof stored in a first stack chain block anchored to the first burn chain block. For example, the node can hash the first proof to form the first message. The first proof may be a VRF proof stored in a header of the first stack chain block (e.g., stored in a header portion of a data structure corresponding to the first stack chain block).

At block 508, a second proof is generated using the first message and a private key. For example, the node can generate the second proof by performing an elliptic curve algorithm, which includes hashing of the first message and the private key of the node.

At block 510, a block commit is transmitted in association with a second burn chain block. For example, the block commit may be a block commit transaction that includes a hash of the second proof and an indication of an amount of cryptocurrency that has been burned or destroyed.

At block 512, a PoW nonce is obtained that is associated with the second burn chain block. For example, the PoW nonce can be obtained from the block data store 225, from another node (e.g., via a broadcasted message), from a centralized data store or database corresponding to the burn chain, and/or the like.

At block 514, a leader is selected for a second stack chain block based on the first message and the PoW nonce. For example, the node can sum, hash, or otherwise combine the first message and the PoW nonce, and compute the combination modulo a normalization value (e.g., $2^{256}-1$ if a 32 byte hash is used) to select the leader. The second stack chain block may reference the first stack chain block as being a parent block. After the leader is selected, the single-leader election routine 500 finishes, as shown at block 516.

Blockchain Forks

Figure 6A:
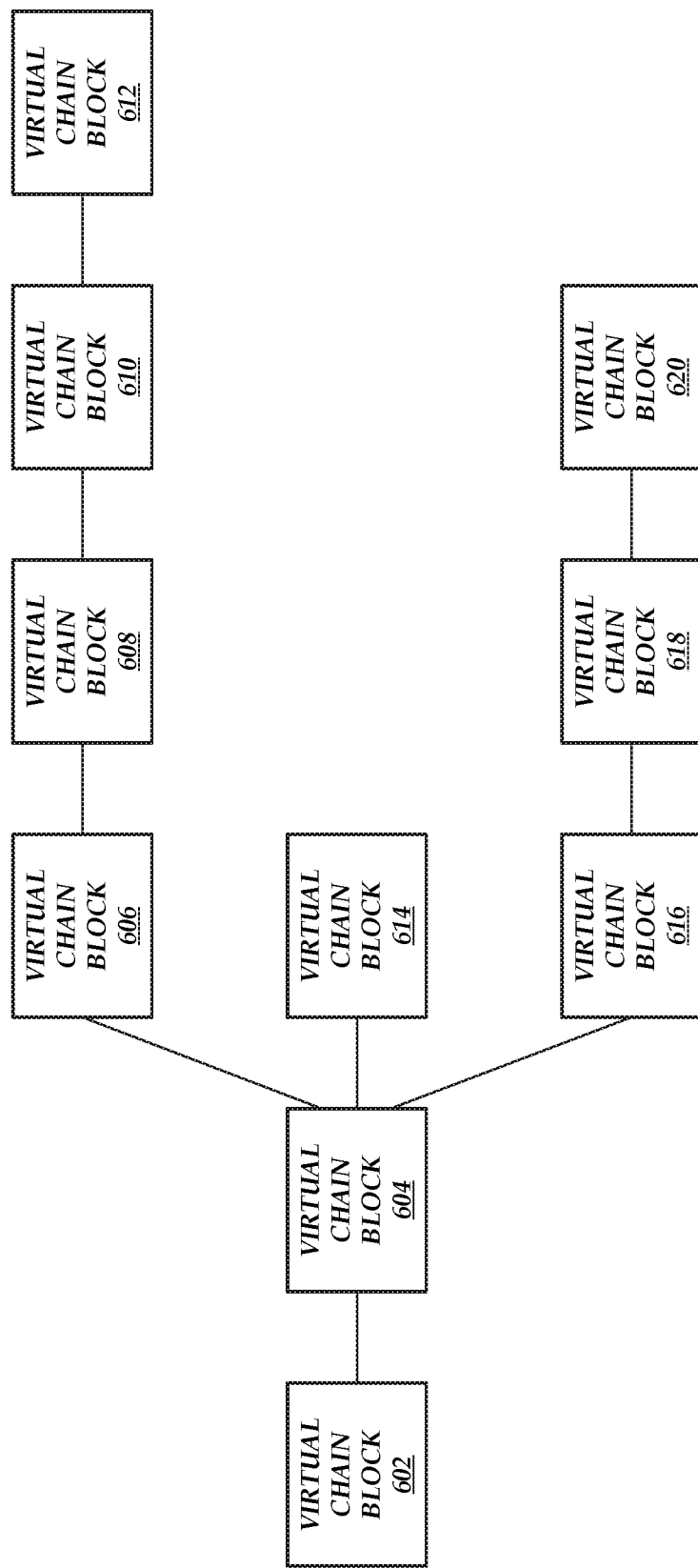
FIGS. 6A-6B are block diagrams depicting a virtual chain in which a fork has occurred.
Figure 6B:
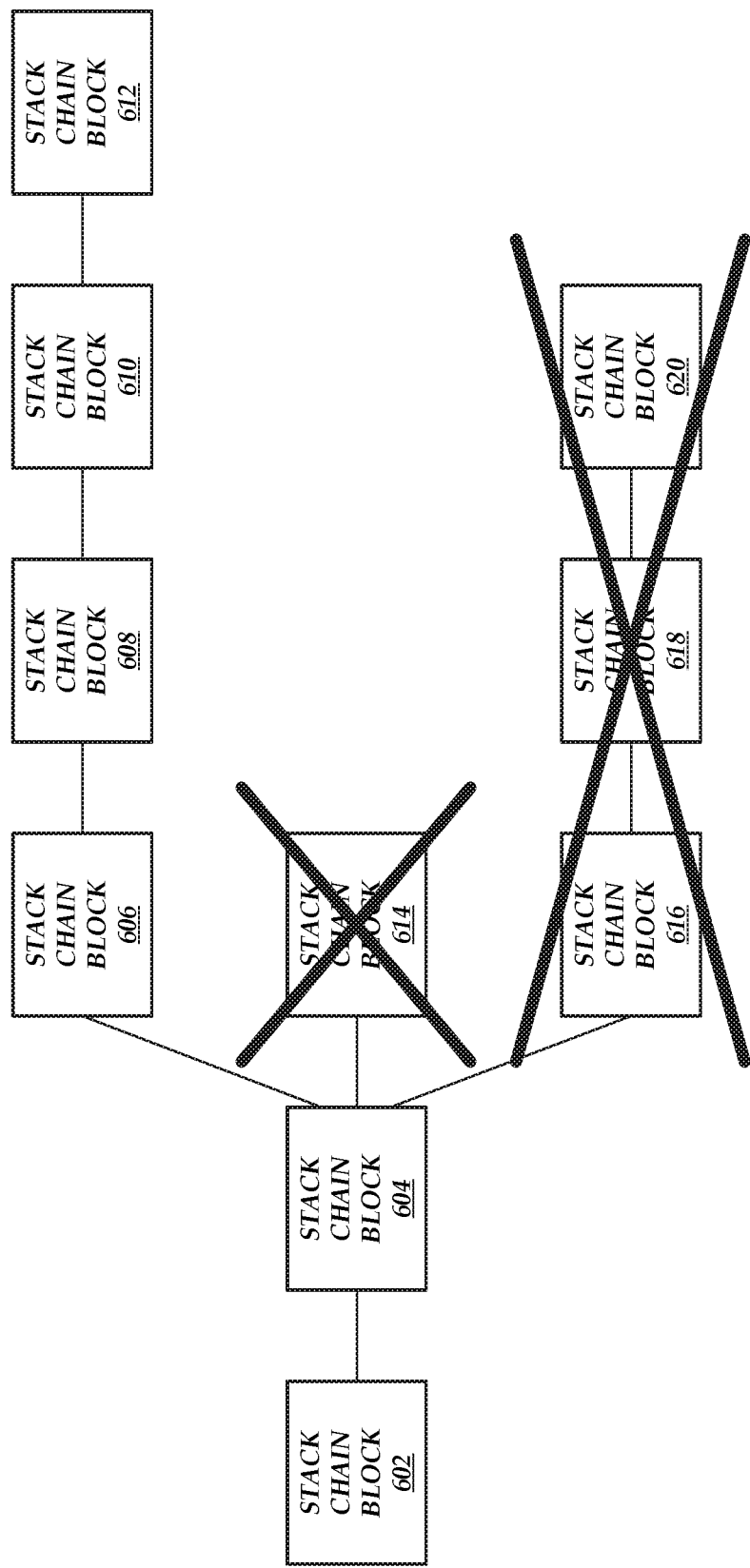

FIGS. 6A-6B are block diagrams depicting a virtual chain in which a fork has occurred. As illustrated in FIG. 6A, virtual chain block 602 is a root block in the virtual chain. Virtual chain block 604 references the virtual chain block 602 as a parent block. The leader of the next virtual chain block, however, may have crashed after being selected as the leader, may suffer from network bandwidth issues causing delays in transmissions, and/or the like. Thus, formation of the next block in the virtual chain block may have been delayed. Alternatively, one node selected as a leader may have decided to reference the next previous block, rather than the previous block, as a parent block. As a result, multiple chains may be present. In particular, one chain starting with virtual chain block 606 may be present, one chain starting with virtual chain block 614 may be present, and one chain starting with virtual chain block 616 may be present (e.g., virtual chain blocks 606, 614, and 616 may each reference the same block, virtual chain block 604, as a parent block).

The VM instances 220 can determine a valid chain or the chain to continue growing based on the age of a chain. As described above, the age of a chain may correspond to the length of a chain given that burn chain blocks are formed at consistent intervals. Thus, the VM instances 220 may determine that the chain that includes virtual chain blocks 606, 608, 610, and 612 to be the valid chain or the chain to continue growing because this chain has the highest number of blocks, as illustrated in FIG. 6B. As a result, the leader of the next sortition may be given the right to form a new virtual chain block that references the virtual chain block 612 as a parent block.

Figure 7:
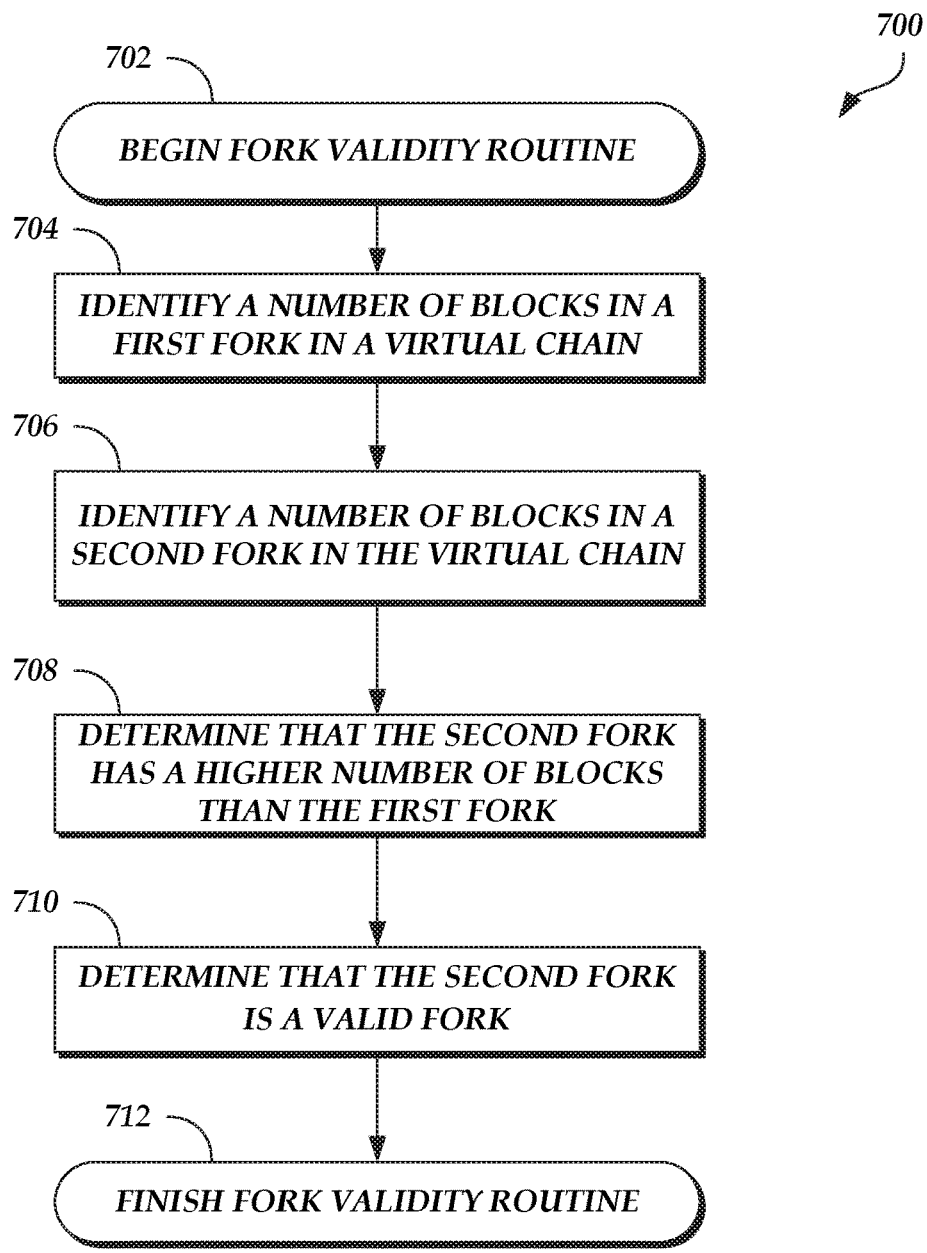
FIG. 7 is a flow diagram depicting a fork validity routine illustratively implemented by a node, according to one embodiment.

FIG. 7 is a flow diagram depicting a fork validity routine 700 illustratively implemented by a node, according to one embodiment. As an example, the virtual chain node 120 of FIG. 1, or a single VM instance 220 running on a virtual chain node 120, can be configured to execute the fork validity routine 700. Alternatively, a combination of a VM instance 220, a user's wallet computing device, and/or a miner computing device can be configured to execute the fork validity routine 700. The fork validity routine 700 begins at block 702.

At block 704, a number of blocks in a first fork in a virtual chain is identified. For example, the first fork may be a first chain that splits from another chain in the virtual chain.

At block 706, a number of blocks in a second fork in the virtual chain is identified. For example, the second fork may be a second chain that splits from the first chain and/or other chains in the virtual chain. The first fork and the second fork may therefore reference the same parent block.

At block 708, a determination is made that the second fork has a higher number of blocks than the first fork. For example, this determination can be made by obtaining block data from the block data store 225, and iterating through the various data structures to identify how many data structures are present in each chain before a data structure references a block at which the fork begins as a parent block.

At block 710, a determination is made that the second fork is a valid fork. For example, the second fork may be the valid fork because the second fork includes the highest number of blocks. After the second fork is determined to be the valid fork, the fork validity routine 700 finishes, as shown at block 712.

Burn Quota

Figure 8:
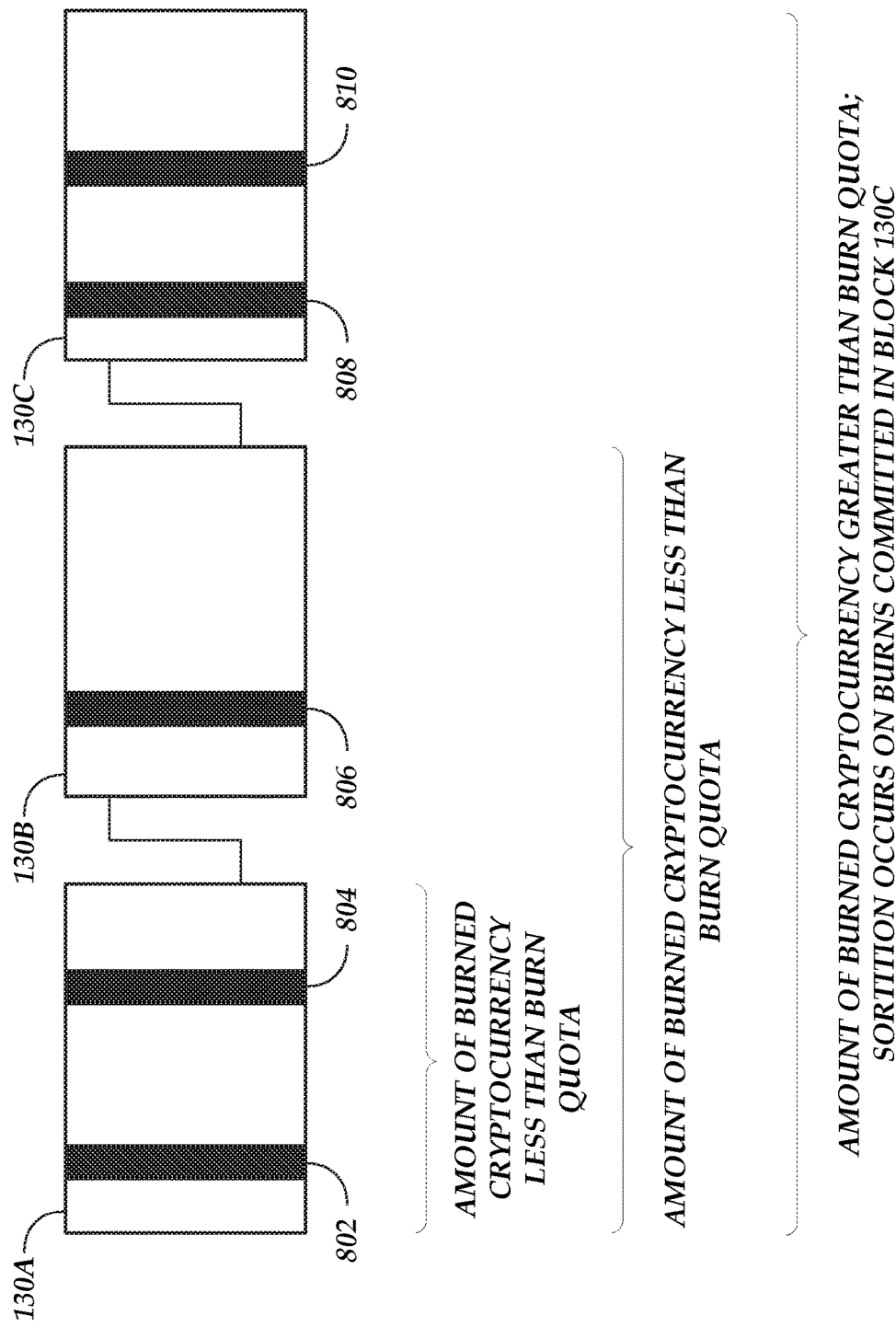
FIG. 8 is a block diagram depicting how a burn quota can affect whether a sortition occurs in association with a block in the burn chain.

FIG. 8 is a block diagram depicting how a burn quota can affect whether a sortition occurs in association with a block in the burn chain. As illustrated in FIG. 8, two block commit transactions 802 and 804 may be executed in association with burn chain block 130A. Each block commit transaction 802 and 804 may indicate an amount of cryptocurrency burned therein. However, the sortition executor 223 may determine that the sum of the amount of cryptocurrency burned therein is less than a burn quota. Thus, the sortition executor 223 does not conduct a sortition in association with the burn chain block 130A even though block commit transactions 802 and 804 have been submitted. Accordingly, no leader of the next virtual chain block is selected. The sortition executor 223 may store sortition data in the block data store 225 indicating that no sortition occurred and/or identifying block commit transactions that have been submitted and that have not been used to exceed a burn quota and initiate a sortition.

In the next block in the burn chain, burn chain block 130B, another block commit transaction 806 is executed. Because a sortition did not occur with respect to the burn chain block 130A, the sortition executor 223 may sum the amount burned in block commit transaction 802, the amount burned in block commit transaction 804, and the amount burned in block commit transaction 806 to determine whether the burn quota is satisfied. Here, the sum of the amounts burned in the block commit transactions 802, 804, and 806 is still less than the burn quota. Thus, the sortition executor 223 does not conduct a sortition in association with the burn chain block 130B even though a block commit transaction 806 has been submitted. Accordingly, still no leader of the next virtual chain block is selected.

In the next block in the burn chain, burn chain block 130C, two additional block commit transactions 808 and 810 are executed. Because a sortition did not occur with respect to the burn chain blocks 130A and 130B, the sortition executor 223 may sum the amount burned in block commit transaction 802, the amount burned in block commit transaction 804, the amount burned in block commit transaction 806, the amount burned in block commit transaction 808, and the amount burned in block commit transaction 810 to determine whether the burn quota is satisfied. Here, the sum of the amounts burned in the block commit transactions 802, 804, 806, 808, and 810 is equal to or greater than the burn quota. Thus, the sortition executor 223 conducts a sortition in association with the burn chain block 130C to select the leader of the next virtual chain block.

In an embodiment, the sortition executor 223 selects the leader of the next virtual chain block based only on nodes that submitted block commit transactions in association with the burn chain block at which the burn quota was exceeded (e.g., burn chain block 130C). Even though the amount burned in block commit transaction 806 contributes to the total sum exceeding the burn quota, the node that submitted the block commit transaction 806 may not be eligible to be selected as the leader unless the node also submitted one of the block commit transactions 808 or 810. If two separate nodes submitted the block commit transactions 808 or 810, the sortition executor 223 may select the leader from one of these two nodes. In determining the probability of selection and the length of an interval in the range of values, the sortition executor 223 may only consider the total amount of cryptocurrency burned in the burn chain block 130C, not the total amount burned in the burn chain blocks 130A-130B.

If the sortition executor 223 skips a sortition because the burn quota is not met and eventually conducts a sortition in a subsequent burn chain block, the sortition executor 223 may reduce the burn quota by a set amount (e.g., as defined by a rule that may be stored in the blockchain data store 140). Alternatively, the sortition executor 223 may reduce the burn quota by a variable amount, such as an amount that depends on the number of sortitions that are skipped. Thus, it may be easier to meet the burn quota in the future. However, if the sortition executor 223 conducts a sortition in a burn chain block and a sortition was not skipped in a previous burn chain block in which a block commit transaction was submitted (e.g., the sortition executor 223 did not have to skip a sortition in a previous burn chain block even though a block commit transaction had been stored), then the sortition executor 223 may increase the burn quota by a set amount (e.g., as defined by a rule that may be stored in the blockchain data store 140). Alternatively, the sortition executor 223 may increase the burn quota by a variable amount, such as an amount that depends on the consecutive number of sortitions that are not skipped. Thus, it may become more difficult to meet the burn quota in the future.

In this way, the architecture can regulate the time intervals at which virtual chain blocks are created.

As an illustrative example, the burn quota may initially be 4. After block commit transactions are entered in association with a first burn chain block, the sortition executor 223 may determine that the total amount burned is 3.2. Thus, the sortition executor 223 does not conduct a sortition in association with the first burn chain block. After block commit transactions are entered in association with a second burn chain block that follows the first burn chain block, the sortition executor 223 may determine that the total amount burned in the two burn chain blocks is 4.1. Because the burn quota is now exceeded, the sortition executor 223 may conduct a sortition in association with the second burn chain block, selecting a leader only from those nodes that submitted a block commit transaction in association with the second burn chain block. The sortition executor 223 may also reduce the burn quota from 4 to 3.2 (e.g., by 20%) given that one sortition was skipped. After block commit transactions are entered in association with a third burn chain block that follows the second burn chain block, the sortition executor 223 may determine that the total amount burned in the third burn chain block is 3.5. Because the burn quota is exceeded, the sortition executor 223 may conduct a sortition in association with the third burn chain block. The sortition executor 223 may also increase the burn quota from 3.2 to 3.68 (e.g., by 15%) because no sortitions were skipped. Alternatively, the sortition executor 223 may increase the burn quota only after sortitions are conducted in two or more consecutive rounds.

Figure 9:
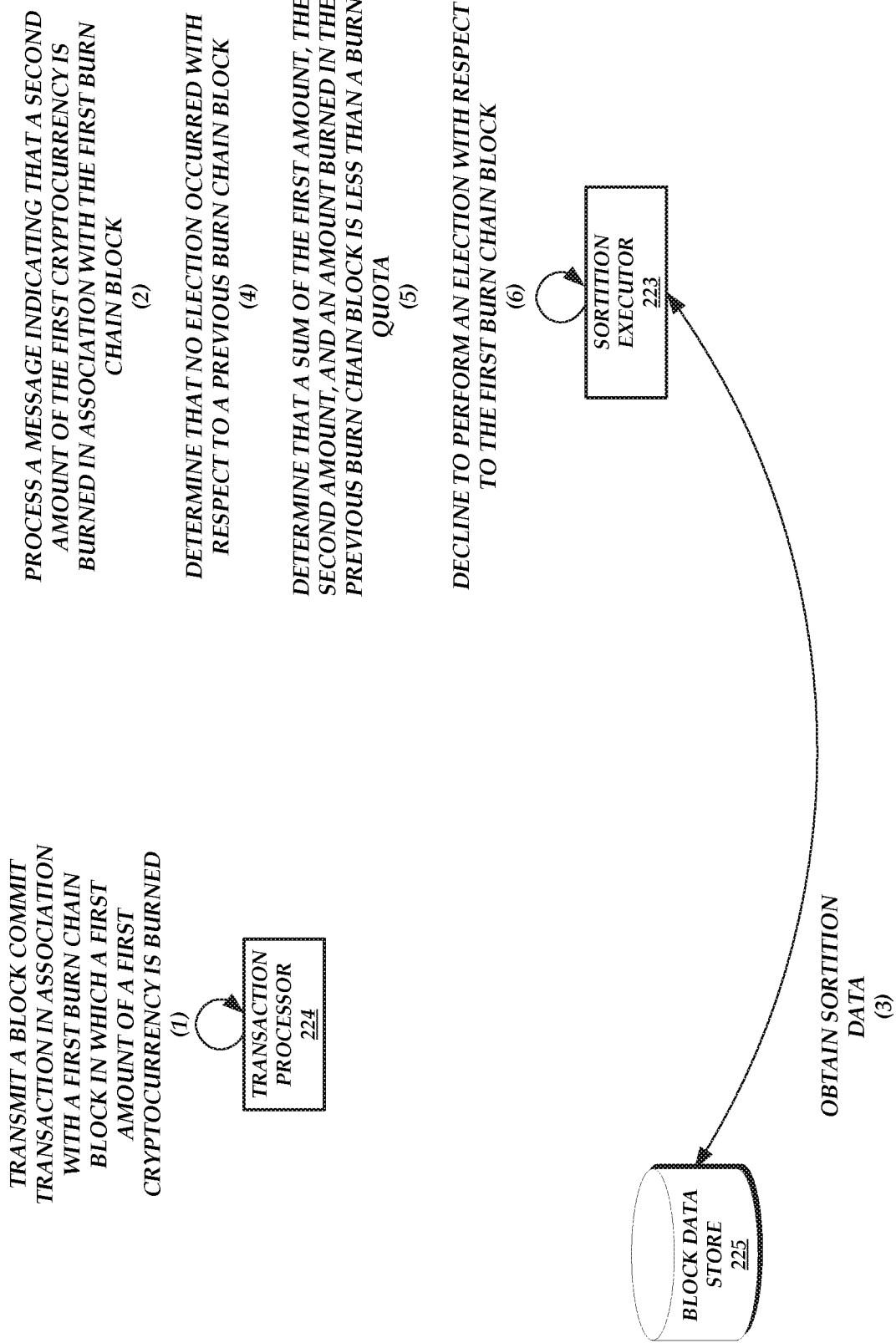
FIG. 9 is a flow diagram illustrating the operations performed by the components of the operating environment of FIG. 2 to perform a single-leader election using a burn quota.

FIG. 9 is a flow diagram illustrating the operations performed by the components of the operating environment 200 of FIG. 2 to perform a single-leader election using a burn quota. As illustrated in FIG. 9, the transaction processor 224 transmits a block commit transaction in association with a first burn chain block in which a first amount of a first cryptocurrency is burned at (1).

The sortition executor 223 may process a message indicating that a second amount of the first cryptocurrency is burned in association with the first burn chain block at (2). For example, the message may be broadcast by another node that has submitted a block commit transaction in association with the first burn chain block.

The sortition executor 223 may then obtain sortition data from the block data store 225 at (3), where the sortition data indicates whether any block commit transactions had been submitted in association with a previous block in the burn chain and that had not been used to exceed the burn quota (e.g., the sortition data may indicate whether any previous sortition had been skipped). Here, the sortition executor 223 may determine that no election occurred with respect to a previous burn chain block at (4) even though a block commit transaction had been submitted. The sortition executor 223 may make this determination based on the sortition data.

Because no sortition or election occurred with respect to the previous burn chain block, the sortition executor 223 considers the amount burned in the previous burn chain block in determining whether the burn quota is exceeded. Here, the sortition executor 223 determines that a sum of the first amount, the second amount, and an amount burned in the previous burn chain block is less than a burn quota at (5). Thus, the sortition executor 223 declines to perform an election with respect to the first burn chain block at (6). The sortition executor 223 may then store updated sortition data in the block data store 225 indicating that two block commit transactions had been submitted in association with the first burn chain block and that no sortition occurred.

Figure 10:
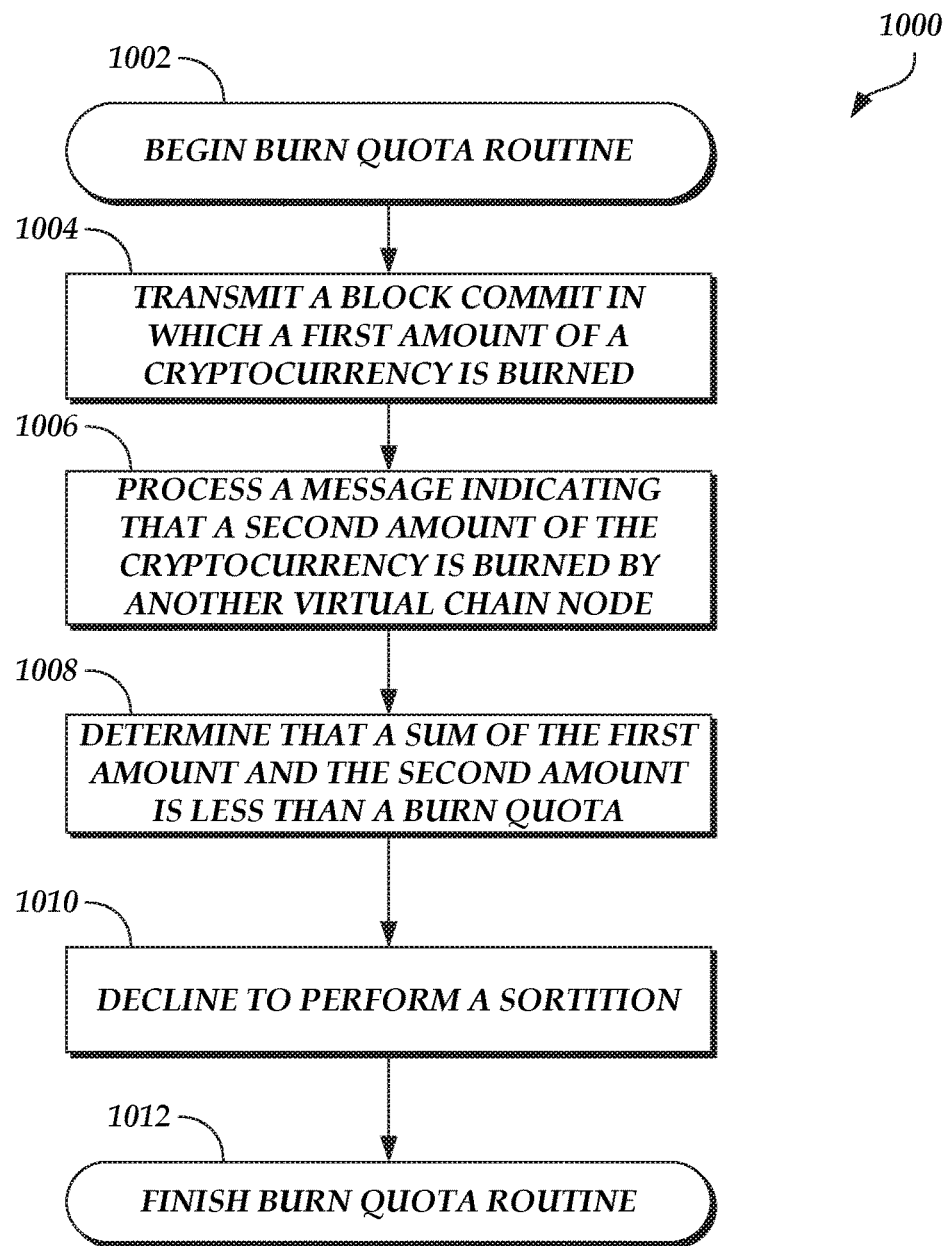
FIG. 10 is a flow diagram depicting a burn quota routine illustratively implemented by a node, according to one embodiment.

FIG. 10 is a flow diagram depicting a burn quota routine 1000 illustratively implemented by a node, according to one embodiment. As an example, the virtual chain node 120 of FIG. 1, or a single VM instance 220 running on a virtual chain node 120, can be configured to execute the burn quota routine 1000. Alternatively, a combination of a VM instance 220, a user's wallet computing device, and/or a miner computing device can be configured to execute the burn quota routine 1000. The burn quota routine 1000 begins at block 1002.

At block 1004, a block commit is transmitted in which a first amount of a cryptocurrency is burned. For example, the burned cryptocurrency may be the cryptocurrency associated with the burn chain, but not the cryptocurrency associated with the virtual chain.

At block 1006, a message indicating that a second amount of the cryptocurrency is burned by another virtual chain node is processed. Thus, two block commit transactions may be submitted in association with a particular burn chain block.

At block 1008, a determination is made that a sum of the first amount and the second amount is less than a burn quota. For example, the burn quota may be a threshold amount of the cryptocurrency that must be burned in order for a sortition to proceed so that a leader of the next block in the virtual chain can be selected.

At block 1010, performing a sortition is declined. For example, the node may decline performing the sortition because the burn quota was not matched or exceeded. After declining to perform the sortition, the burn quota routine 1000 finishes, as shown at block 1012.

Decentralized Fair Mining Pools

Figure 11:
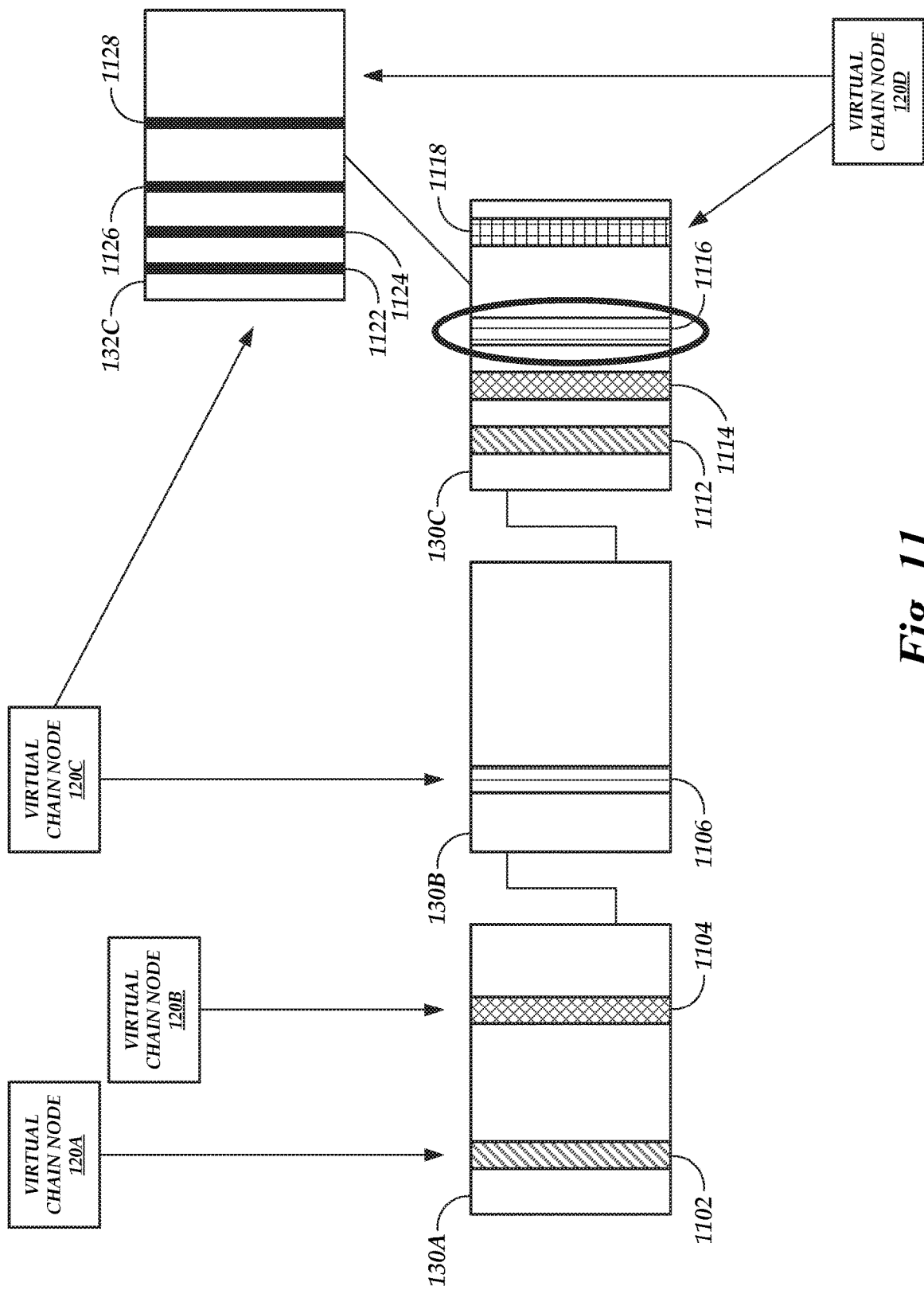
FIG. 11 is a block diagram depicting a process by which various virtual chain nodes of FIG. 1 can participate in a single-leader election and form mining pools.

FIG. 11 is a block diagram depicting a process by which various virtual chain nodes 120A-120D can participate in a single-leader election and form mining pools. As illustrated in FIG. 11, a VM instance 220 running on the virtual chain node 120A has submitted a public key registration transaction 1102 in burn chain block 130A. The public key registration transaction 1102 may include a public key of the VM instance 220 running on the virtual chain node 120A (which may be the public key of the virtual chain node 120A if a single VM instance is running on the virtual chain node 120A).

Similarly, a VM instance 220 running on the virtual chain node 120B has submitted a public key registration transaction 1104 in the burn chain block 130A. The public key registration transaction 1104 may include a public key of the VM instance 220 running on the virtual chain node 120B.

Because the VM instances 220 running on the virtual chain nodes 120A-120B have submitted public key registration transactions in association with the burn chain block 130A, these VM instances 220 can begin participating in elections that occur in association with any burn chain block 130 that is a child of the burn chain block 130A. For example, these VM instances 220 running on virtual chain nodes 120A-120B can participate in an election that occurs in association with burn chain block 130B (which is a child block of the burn chain block 130A) or can participate in an election that occurs in association with burn chain block 130C (which is a child block of the burn chain block 130B).

A VM instance 220 running on the virtual chain node 120C may submit a public key registration transaction 1106 in the burn chain block 130B. The public key registration transaction 1106 may include a public key of the VM instance 220 running on the virtual chain node 120B. Thus, the VM instance 220 running on the virtual chain node 120C can participate in an election that occurs in association with any burn chain block 130 that is a child of the burn chain block 130B (e.g., the burn chain block 130C).

As described herein, a VM instance 220 submits a block commit transaction in association with a burn chain block 130 to participate in an election associated with the burn chain block 130. Here, the VM instance 220 running on the virtual chain node 120A submits a block commit transaction 1112 in association with the burn chain block 130C. Similarly, the VM instance 220 running on the virtual chain node 120B submits a block commit transaction 1114 in association with the burn chain block 130C, and the VM instance 220 running on the virtual chain node 120C submits a block commit transaction 1116 in association with the burn chain block 130C.

VM instances 220 running on virtual chain nodes 120 that have not yet submitted a public key registration transaction (or that have submitted a public key registration transaction) can nonetheless participate in the election in a limited manner. For example, the VM instance 220 running on the virtual chain node 120D has not submitted a public key registration transaction and therefore cannot be selected as a leader of the virtual chain block 132C. However, the VM instance 220 running on the virtual chain node 120D can nonetheless submit a user burn transaction 1118 that allows the VM instance 220 running on the virtual chain node 120D to capture a portion of the block reward if a designated VM instance 220 that has submitted a public key registration transaction and a block commit transaction is selected as a leader.

For example, each of the block commit transactions 1112, 1114, and 1116 may indicate an amount of cryptocurrency that has been burned and may include a VRF proof of the respective VM instance 220. The user burn transaction 1118 may indicate an amount of cryptocurrency that has been burned and may designate a VM instance 220 to which the burned amount should be applied. Here, the user burn transaction 1118 may designate the VM instance 220 running on the virtual chain node 120C. Thus, if the VM instance 220 running on the virtual chain node 120C burned N amount of the cryptocurrency in the block commit transaction 1116, and the VM instance 220 running on the virtual chain node 120D burn M amount of the cryptocurrency in the user burn transaction 1118, the sortition executor 223 may consider the VM instance 220 running on the virtual chain node 120C to have burned N+M amount of the cryptocurrency when determining the probability that the VM instance 220 running on the virtual chain node 120C should be selected as a leader (e.g., when determining the portion of the range of values that should be assigned to the VM instance 220 running on the virtual chain node 120C).

Each virtual chain node 120A-120D and/or other virtual chain nodes 120 may independently conduct a sortition based on the block commit transactions 1112, 1114, and 1116 and the user burn transaction 1118 to determine a leader of virtual chain block 132C, which may be the next block in the virtual chain and which may be anchored to the burn chain block 130C (e.g., anchored to the block in the burn chain for which a sortition is occurring). The VM instance 220 running on the virtual chain node 120A may have a probability of being selected as a leader that is based on the amount of cryptocurrency burned in the block commit transaction 1112 as a percentage of the total amount burned in the block commit transactions 1112, 1114, and 1116 and the user burn transaction 1118. Similarly, the VM instance 220 running on the virtual chain node 120B may have a probability of being selected as a leader that is based on the amount of cryptocurrency burned in the block commit transaction 1114 as a percentage of the total amount burned in the block commit transactions 1112, 1114, and 1116 and the user burn transaction 1118. The VM instance 220 running on the virtual chain node 120C, however, may have a probability of being selected as a leader that is based on a sum of the amount of cryptocurrency burned in the block commit transaction 1116 and the amount of cryptocurrency burned in the user burn transaction 1118 as a percentage of the total amount burned in the block commit transactions 1112, 1114, and 1116 and the user burn transaction 1118.

Here, the VM instance 220 running on the virtual chain node 120C is selected as the leader of the virtual chain block 132. Because the VM instance 220 running on the virtual chain node 120D increased the chances that the VM instance 220 running on the virtual chain node 120C would be selected as the leader, both VM instances 220 may share in an awarded block reward. For example, the VM instance 220 running on the virtual chain node 120C may receive a percentage of the block reward that is equal to a percentage of the total amount burned by the VM instances 220 running on the virtual chain nodes 120C-120D that is burned by the VM instance 220 running on the virtual chain node 120C. Similarly, the VM instance 220 running on the virtual chain node 120D may receive a percentage of the block reward that is equal to a percentage of the total amount burned by the VM instances 220 running on the virtual chain nodes 120C-120D that is burned by the VM instance 220 running on the virtual chain node 120D. Because the VM instance 220 running on the virtual chain node 120C submitted the winning block commit transaction, however, the VM instance 220 running on the virtual chain node 120C and not the VM instance 220 running on the virtual chain node 120D can obtain transaction fees for each transactions stored on the virtual chain block 132C. For example, the VM instance 220 running on the virtual chain node 120C can obtain transaction fees for various transactions 1122, 1124, 1126, and 1128 that are stored or encoded in the virtual chain block 132C. The VM instance 220 running on the virtual chain node 120D, however, cannot obtain transaction fees for any of the transactions 1122, 1124, 1126, and 1128 that are stored or encoded in the virtual chain block 132C.

A VM instance 220 is not limited to submitting a single user burn transaction in association with a particular burn chain block 130. For example, a VM instance 220 can submit multiple user burn transactions in association with a single burn chain block 130, with each user burn transaction designating a same or different VM instance 220. By designating different VM instances 220, a particular VM instance 220 can hedge bets to increase the odds that the cryptocurrency burn will lead to some block reward.

In further embodiments, an amount of cryptocurrency burned in a user burn transaction can contribute to the total count of the amount burned when determining whether the burn quota is exceeded. Thus, user burn transactions can help nodes ensure that the burn quota is exceeded so that a sortition occurs.

Alternatively, as described above in an embodiment in which separate miner computing devices are present, the functionality described herein with respect to FIG. 11 can be performed by the miner computing devices and the VM instance 220. For example, the VM instance 220 running on a virtual chain node 120 can select the leader of the virtual chain block 132C, and miner computing devices can perform the remaining functionality (e.g., a first miner computing device can submit the public key registration 1102 and the block commit transaction 1112, a second miner computing device can submit the public key registration 1104 and the block commit transaction 1114, a third miner computing device can submit the public key registration 1106 and the block commit transaction 1116, a fourth miner computing device can submit the user burn transaction 1118, the VM instance 220 can select the first, second, or third miner computing devices as the leader, the selected miner computing device leader can process any block rewards or transaction fees, and any miner computing device that submitted a user burn transaction on behalf of the selected miner computing device can process any block rewards).

Figure 12:
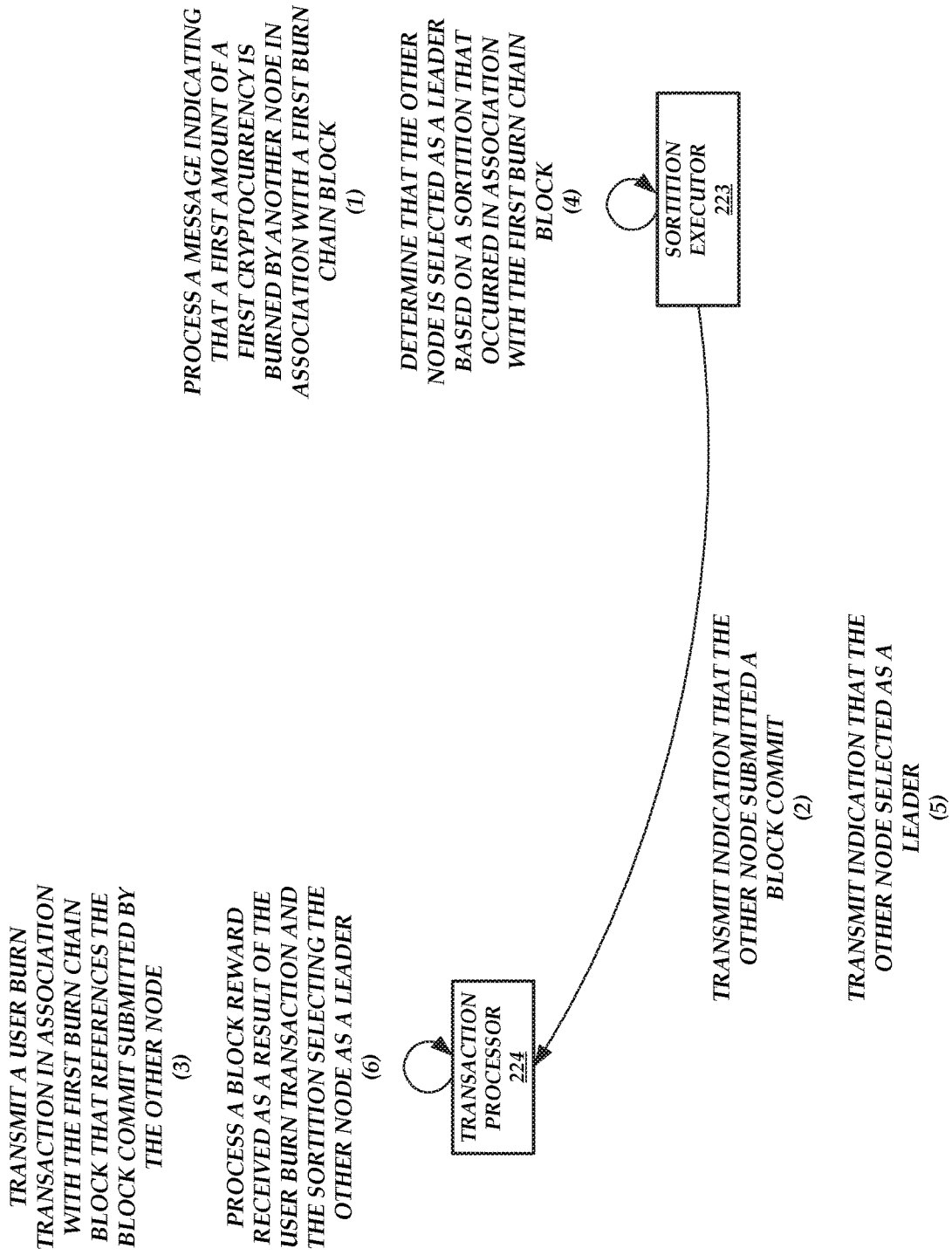
FIG. 12 is a flow diagram illustrating the operations performed by the components of the operating environment of FIG. 2 to perform a single-leader election using a user burn transaction.

FIG. 12 is a flow diagram illustrating the operations performed by the components of the operating environment 200 of FIG. 2 to perform a single-leader election using a user burn transaction. As illustrated in FIG. 12, the sortition executor 223 processes a message indicating that a first amount of a first cryptocurrency is burned by another node in association with a first burn chain block at (1). For example, another node may have submitted a block commit transaction in which a first amount of the first cryptocurrency is burned. The sortition executor 223 can then transmit to the transaction processor 224 an indication that the other node submitted a block commit at (2).

The transaction processor 224 can transmit a user burn transaction in association with the first burn chain block that references the block commit submitted by the other node at (3). A second amount of the first cryptocurrency may be burned in association with the user burn transaction, and this amount may be allocated to the other node.

Once block commit transactions and/or user burn transactions are submitted, the sortition executor 223 determines that the other node is selected as a leader based on a sortition that occurred in association with the first burn chain block at (4). As a result, the sortition executor 223 transmits an indication to the transaction processor 224 that the other node is selected as a leader at (5).

The transaction processor 224 then processes a block reward received as a result of the user burn transaction and the sortition selecting the other node as a leader at (6). For example, because the user burn transaction designated the other node and the other node was selected as the leader, the present node receives a portion of the block reward as a reward for improving the chances that the other node is selected as the leader.

Figure 13:
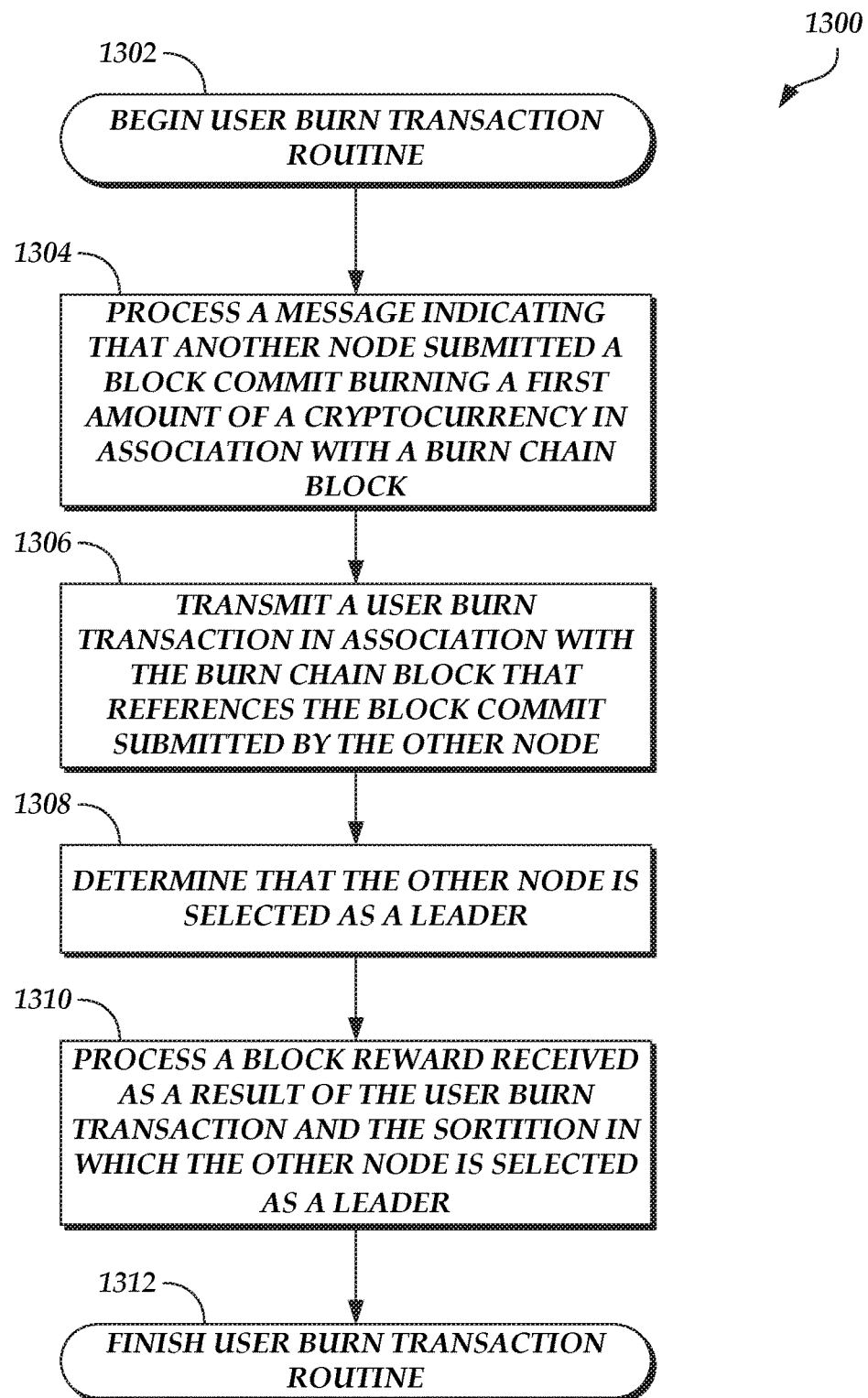
FIG. 13 is a flow diagram depicting a user burn transaction routine illustratively implemented by a node, according to one embodiment.

FIG. 13 is a flow diagram depicting a user burn transaction routine 1300 illustratively implemented by a node, according to one embodiment. As an example, the virtual chain node 120 of FIG. 1, or a single VM instance 220 running on a virtual chain node 120, can be configured to execute the user burn transaction routine 1300. Alternatively, a combination of a VM instance 220, a user's wallet computing device, and/or a miner computing device can be configured to execute the user burn transaction routine 1300. The user burn transaction routine 1300 begins at block 1302.

At block 1304, a message indicating that another node has submitted a block commit burning a first amount of a cryptocurrency in association with a burn chain block is processed. Other nodes may have also submitted other block commits in association with the burn chain block.

At block 1306, a user burn transaction is transmitted in association with the burn chain block that references the block commit submitted by the other node. The user burn transaction may further burn a second amount of cryptocurrency, such that referencing the block commit submitted by the other node causes the second amount burned to be designated as being burned by the other node for the purposes of conducting the sortition.

At block 1308, a determination is made that the other node is selected as a leader. For example, the other node may be selected as the leader based on a probability derived from the amount burned by the other node and the amount burned in the user burn transaction.

At block 1310, a block reward received as a result of the user burn transaction and the sortition in which the other node is selected as a leader is processed. For example, the block reward may be received as a reward for improving the chances that the other node is selected as the leader. No block reward may have been received if another node separate from the other node had been selected as the leader. After the block reward is processed, the user burn transaction routine 1300 finishes, as shown at block 1312.

Bootstrapping a Separate Proof of Work Chain

Figure 14:
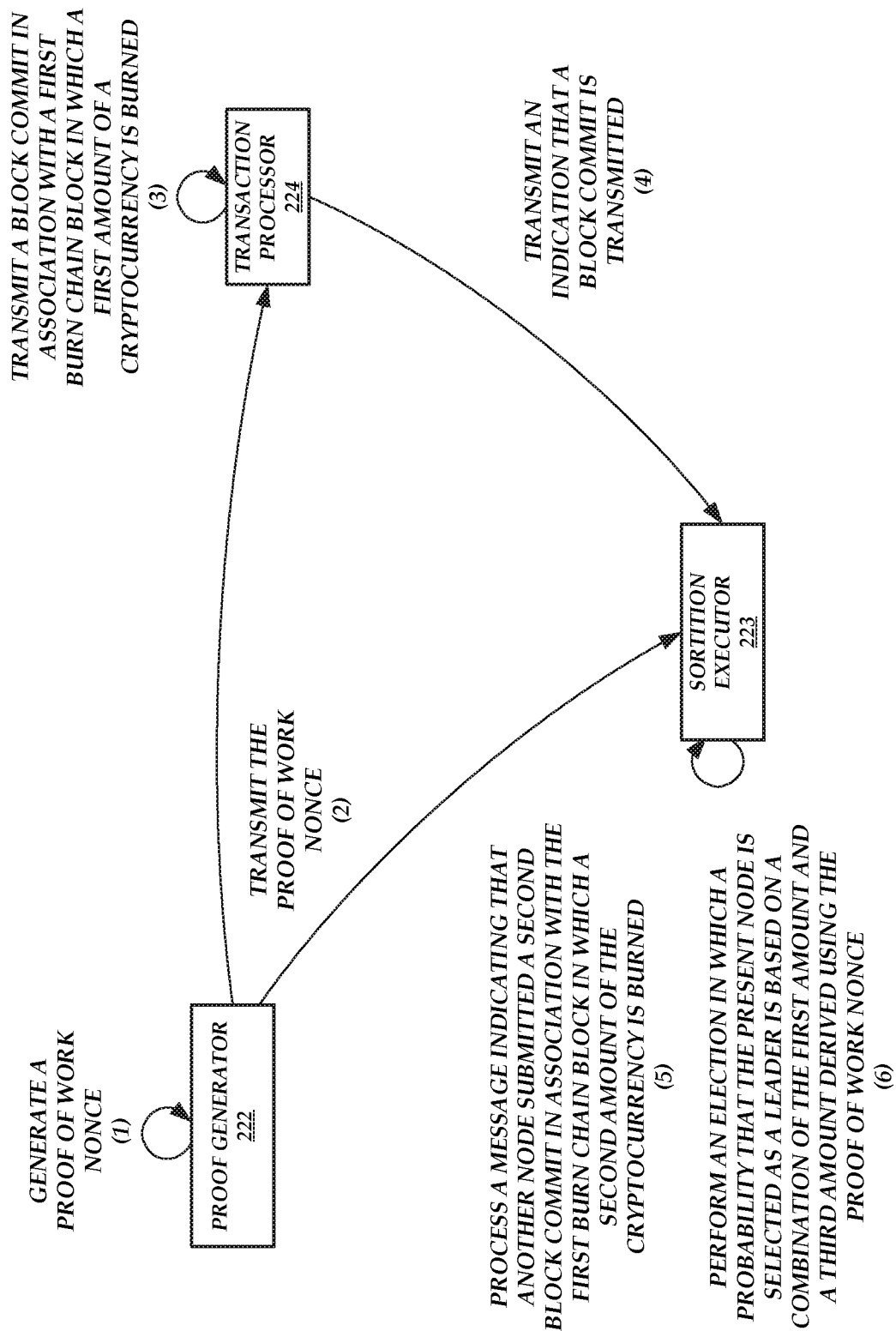
FIG. 14 is a flow diagram illustrating the operations performed by the components of the operating environment of FIG. 2 to bootstrap a separate proof of work chain.

FIG. 14 is a flow diagram illustrating the operations performed by the components of the operating environment 200 of FIG. 2 to bootstrap a separate proof of work chain. As illustrated in FIG. 14, the proof generator 222 generates a proof of work nonce at (1). For example, a difficulty level may be defined by a rule, such as a rule stored in the blockchain data store 140. The proof generator 222 may attempt to find a proof of work nonce value that, when combined with a header of the previous block in the virtual chain and hashed, produces a hash value that is less than (or greater than) a threshold value defined by the difficulty level. In particular, the difficulty level may indicate that the threshold value should have a certain number of leading 0s. The proof of work nonce generated by the proof generator 222 may be separate from a proof of work nonce present in the burn chain blocks.

The proof generator 222 may iterate through various proof of work nonce values before finding the value that results in a hash value being less than the threshold value. Thus, the proof generator 222 may perform multiple hash operations before finding the right proof of work nonce value. If the proof generator 222 starts the proof of work nonce value at 0 or 1 (or another low number) and increments the proof of work nonce value each time the hash value exceeds the threshold value, then the proof of work nonce value itself may represent roughly a number of hash operations performed by the proof generator 222 before the appropriate proof of work nonce value was found. Each hash operation may generally consume a specific amount of energy, and thus the proof of work nonce value can be mapped to an energy consumption value (e.g., by multiplying the proof of work nonce value by the amount of energy consumed during a single hash operation). Similarly, a specific amount of energy may generally be consumed to mine a specific amount of a specific type of cryptocurrency. Thus, the proof of work nonce can further be mapped to a cryptocurrency amount (e.g., by multiplying the proof of work nonce value by the amount of energy consumed during a single hash operation and dividing the product by the amount of energy consumed to mine a single unit of the cryptocurrency). As described below, the sortition executor 223 can use this mapping to calculate a burn bonus.

After generating the proof of work nonce, the proof generator 222 can transmit the proof of work nonce at (2) to the transaction processor 224 and/or the sortition executor 223. The transaction processor 224 can transmit a block commit in association with a first burn chain block in which a first amount of a cryptocurrency is burned at (3). The block commit can include the proof of work nonce generated by the proof generator 222. The transaction processor 224 can then transmit to the sortition executor 223 an indication that a block commit is transmitted at (4).

The sortition executor 223 can process a message indicating that another node submitted a second block commit in association with the first burn chain block in which a second amount of the cryptocurrency is burned at (5). Thus, the present node and another node may have submitted block commit transactions. Normally, the sortition executor 223 may conduct a sortition with the present node having a probability of being selected as a leader based on a percentage of a sum of the first and second amounts that is the first amount, and the other node having a probability of being selected as a leader based on a percentage of the sum of the first and second amounts that is the second amount. However, the sortition executor 223 can use the generated proof of work nonce to supplement the amount of cryptocurrency burned by the present node when determining leader selection probabilities.

For example, the sortition executor 223 can perform an election in which a probability that the present node is selected as a leader is based on a combination of the first amount and a third amount derived using the proof of work nonce at (6). In particular, the third amount may be the amount of cryptocurrency that the sortition executor 223 maps to the proof of work nonce value based on the mappings described above. The third amount may be referred to as the burn bonus. The sortition executor 223 can then sum the first amount and the third amount to form a fourth amount. The probability that the present node is selected as a leader is then equivalent to a percentage of a sum of the second amount and the fourth amount that is the fourth amount, and the probability that the other node is selected as a leader is equivalent to a percentage of the sum of the second amount and the fourth amount that is the second amount.

As described herein, the amount by which the burn bonus can increase the amount of actual cryptocurrency burned by a node is limited. For example, the burn bonus may be limited to 5% (e.g., the burn bonus can only increase the amount of actual cryptocurrency burned by 5%). The burn bonus limit may increase over time, however. The burn bonus limit may be defined by a rule, such as a rule stored in the blockchain data store 140. Limiting the burn bonus and then increasing the limit over time may ensure the stability and security of the virtual chain for the reasons discussed above.

If the burn bonus exceeds the limit, the sortition executor 223 may reduce the total burn amount allocated to a node until the burn bonus meets the limit. Thus, if the burn bonus ends up being 6% and the limit is 5%, the sortition executor 223 may reduce the cryptocurrency amount derived from the proof of work nonce until the burn bonus is 5%.

In other embodiments, the burn bonus is not limited. Thus, the burn bonus can increase the amount of actual cryptocurrency burned by any amount.

Figure 15:
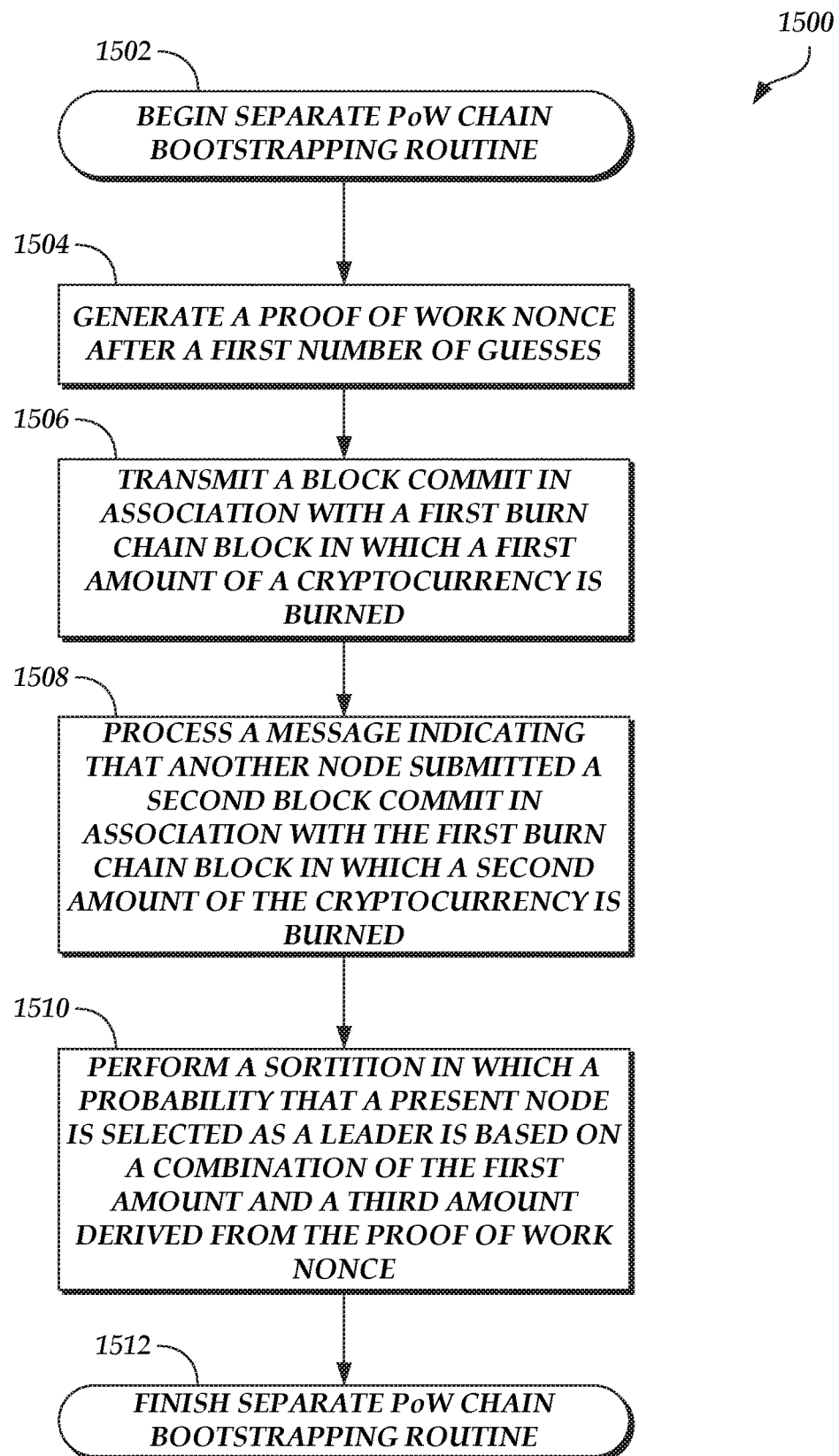
FIG. 15 is a flow diagram depicting a separate PoW chain bootstrapping routine illustratively implemented by a node, according to one embodiment.

FIG. 15 is a flow diagram depicting a separate PoW chain bootstrapping routine 1500 illustratively implemented by a node, according to one embodiment. As an example, the virtual chain node 120 of FIG. 1, or a single VM instance 220 running on a virtual chain node 120, can be configured to execute the separate PoW chain bootstrapping routine 1500. Alternatively, a combination of a VM instance 220, a user's wallet computing device, and/or a miner computing device can be configured to execute the separate PoW chain bootstrapping routine 1500. The separate PoW chain bootstrapping routine 1500 begins at block 1502.

At block 1504, a proof of work nonce is generated after a first number of guesses. For example, the proof of work nonce may be generated after a first number of hash operations are performed.

At block 1506, a block commit is transmitted in association with a first burn chain block in which a first amount of a cryptocurrency is burned. The block commit can optionally include the proof of work nonce generated separately from the burn chain. The proof of work nonce value can be mapped to a third amount of the cryptocurrency.

At block 1508, a message indicating that another node submitted a second block commit in association with the first burn chain block in which a second amount of the cryptocurrency is burned. Thus, two nodes may have submitted block commit transactions in association with the first burn chain block.

At block 1510, a sortition is performed in which a probability that a present node is selected as a leader is based on a combination of the first amount and a third amount derived from the proof of work nonce. For example, the third amount can be derived from the first number of guesses, which is roughly indicated by the value of the proof of work nonce. The first number of guesses can map to a number of hash operations that are performed, which can map to a certain amount of energy consumed, which can map to the third amount of cryptocurrency (which is an amount of cryptocurrency that would have been obtained if the energy consumed had been directed to mining the cryptocurrency). After the sortition is performed, the separate PoW chain bootstrapping routine 1500 finishes, as shown at block 1512.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or logic circuitry that implements a state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computing device of a decentralized network comprising:
   a network interface configured to couple the computing device to the decentralized network;
   a hardware processor; and
   a non-transitory computer readable storage medium storing program instructions for execution by the hardware processor in order to cause the computing device to:
   register a public key in association with a first block in a burn chain;
   generate a hash of a first proof stored in a header of a first block in a stack chain to form a first message, wherein the first block in the stack chain is anchored to the first block in the burn chain;
   generate a second proof using the first message and a private key;
   transmit a block commit in association with a second block in the burn chain, wherein the block commit comprises the second proof and an indication that a first amount of a first cryptocurrency is burned, and wherein the computing device is assigned an interval within a range of values, a length of the interval based on the first amount of the first cryptocurrency that is burned;
   obtain a proof of work nonce associated with the second block in the burn chain;
   generate a second value based on the first message and the proof of work nonce; and
   generate a second block in the stack chain in response to the second value falling within the interval, wherein the second block in the stack chain is anchored to the second block in the burn chain, wherein a header of the second block in the stack chain comprises the second proof, wherein the first and second blocks in the stack chain are associated with a first fork in the stack chain, wherein a third block in the stack chain is associated with a second fork in the stack chain and is anchored to a third block in the burn chain, and wherein the first block in the stack chain and the third block in the stack chain share a parent block in the stack chain.

2. The computing device of claim 1, wherein the program instructions, when executed, further cause the computing device to:
   determine a number of blocks in the first fork is greater than a number of blocks in the second fork; and
   determine that the first fork is a valid fork.

3. The computing device of claim 1, wherein the block commit further comprises a hash of data of a second parent block in the stack chain and a reference to the second parent block in the stack chain.

4. The computing device of claim 3, wherein the second parent block in the stack chain comprises the first block in the stack chain.

5. The computing device of claim 1, wherein the program instructions, when executed, further cause the computing device to:
   combine the first message and the proof of work; and
   compute the combination modulo a normalization value to determine the second value.

6. The computing device of claim 1, wherein the program instructions, when executed, further cause the computing device to obtain a block reward in response to the second value falling within the interval.

7. The computing device of claim 6, wherein the block reward is a second cryptocurrency different than the first cryptocurrency.

8. A computer-implemented method comprising:
   under control of a computing device in a decentralized network,
   registering a public key in association with a first block in a burn chain;
   generating a hash of a first proof stored in a header of a first block in a stack chain to form a first message;
   generating a second proof using the first message and a private key;
   transmitting a block commit in association with a second block in the burn chain, wherein the block commit comprises the second proof and an indication that a first amount of a cryptocurrency is burned, and wherein the computing device is assigned an interval within a range of values, a length of the interval based on the first amount of the cryptocurrency that is burned;
   obtaining a proof of work nonce associated with the second block in the burn chain;
   generating a second value based on the first message and the proof of work nonce; and
   generating a second block in the stack chain in response to the second value falling within the interval, wherein the first and second blocks in the stack chain are associated with a first fork in the stack chain, wherein a third block in the stack chain is associated with a second fork in the stack chain and is anchored to a third block in the burn chain, wherein the first block in the stack chain and the third block in the stack chain share a parent block in the stack chain.

9. The computer-implemented method of claim 8, further comprising:
   determining a number of blocks in the first fork is greater than a number of blocks in the second fork; and
   determining that the first fork is a valid fork.

10. The computer-implemented method of claim 8, wherein the block commit further comprises a hash of data of a second parent block in the stack chain and a reference to the second parent block in the stack chain.

11. The computer-implemented method of claim 10, wherein the second parent block in the stack chain comprises the first block in the stack chain.

12. The computer-implemented method of claim 8, wherein generating a second value further comprises:
   combining the first message and the proof of work; and
   computing the combination modulo a normalization value to determine the second value.

13. The computer-implemented method of claim 8, further comprising obtaining a block reward in response to the second value falling within the interval.

14. The computer-implemented method of claim 13, wherein the block reward is a second cryptocurrency different than the cryptocurrency.

15. Non-transitory, computer-readable storage media comprising computer-executable instructions for conducting a single-leader election in a blockchain, wherein the computer-executable instructions, when executed by a computer system, cause the computer system to:
   generate a hash of a first proof stored in a header of a first block in a stack chain to form a first message;
   generate a second proof using the first message and a private key;
   transmit a block commit in association with a first block in the burn chain, wherein the block commit comprises the second proof and an indication that a first amount of a cryptocurrency is burned, and wherein the computer system is assigned an interval within a range of values, a length of the interval based on the first amount of the cryptocurrency that is burned;
   obtain a proof of work nonce associated with the first block in the burn chain;
   generate a second value based on the first message and the proof of work nonce; and
   generate a second block in the stack chain in response to the second value falling within the interval, wherein the first and second blocks in the stack chain are associated with a first fork in the stack chain, and wherein a third block in the stack chain is associated with a second fork in the stack chain and is anchored to a third block in the burn chain, wherein the first block in the stack chain and the third block in the stack chain share a parent block in the stack chain.

16. The non-transitory, computer-readable storage media of claim 15, wherein the computer-executable instructions further cause the computer system to:
   determine a number of blocks in the first fork is greater than a number of blocks in the second fork; and
   determine that the first fork is a valid fork.

17. The non-transitory, computer-readable storage media of claim 15, wherein the computer-executable instructions further cause the computer system to:
   combine the first message and the proof of work; and
   compute the combination modulo a normalization value to determine the second value.

* * * * *